(12) United States Patent
Bromand et al.

(10) Patent No.: US 12,348,597 B2
(45) Date of Patent: *Jul. 1, 2025

(54) PREDICTIVE CACHING

(71) Applicant: Spotify AB, Stockholm (SE)

(72) Inventors: Daniel Bromand, Stockholm (SE);
Horia Jurcut, Hägersten (SE);
Carl-Johan Larsson, Stockholm (SE);
Fredrik Håkansson, Stockholm (SE)

(73) Assignee: Spotify AB, Stockholm (SE)

( * ) Notice: Subject to any disclaimer, the term of this patent is extended or adjusted under 35 U.S.C. 154(b) by 63 days.

This patent is subject to a terminal disclaimer.

(21) Appl. No.: 17/694,766

(22) Filed: Mar. 15, 2022

(65) Prior Publication Data

US 2022/0210242 A1 Jun. 30, 2022

Related U.S. Application Data

(63) Continuation of application No. 16/372,495, filed on Apr. 2, 2019, now Pat. No. 11,316,944.

(30) Foreign Application Priority Data

May 2, 2018 (EP) .................................... 18170470

(51) Int. Cl.
*H04L 67/568* (2022.01)
*G06N 3/044* (2023.01)
(Continued)

(52) U.S. Cl.
CPC .......... *H04L 67/568* (2022.05); *G06N 3/044* (2023.01); *G06N 3/08* (2013.01); *H04L 65/61* (2022.05);
(Continued)

(58) Field of Classification Search
USPC ....................................................... 709/217
See application file for complete search history.

(56) References Cited

U.S. PATENT DOCUMENTS 7,035,863 B2 4/2006 Kurapati et al.
7,779,357 B2 8/2010 Naik
(Continued)

FOREIGN PATENT DOCUMENTS

AU 2016250446 11/2016
EP 2214175 8/2010
(Continued)

OTHER PUBLICATIONS

Endo et al, Predicting Destinations from Partial Trajectories Using Recurrent Neural Network, Apr. 2017, https://link.springer.com/chapter/10.1007/978-3-319-57454-7_13 (Year: 2017).*
(Continued)

*Primary Examiner* — Atta Khan
(74) *Attorney, Agent, or Firm* — McDonnell & Berghoff Hulbert & Berghoff LLP

(57) ABSTRACT

Systems, devices, apparatuses, components, methods, and techniques for predicting user and media-playback device states are provided. Systems, devices, apparatuses, components, methods, and techniques for media content item caching on a media-playback device are also provided. Systems, devices, apparatuses, components, methods, and techniques for predicting a destination are also provided.

20 Claims, 19 Drawing Sheets

(51) Int. Cl.
*G06N 3/08* (2023.01)
*H04L 65/61* (2022.01)
*H04L 67/5681* (2022.01)
*H04L 67/62* (2022.01)
*H04W 4/029* (2018.01)

(52) U.S. Cl.
CPC ........ *H04L 67/5681* (2022.05); *H04W 4/029* (2018.02); *H04L 67/62* (2022.05)

(56) References Cited

U.S. PATENT DOCUMENTS

| | | | |
|---|---|---|---|
| 8,239,911 B1* | 8/2012 | Sun | H04N 21/2187 |
| | | | 725/87 |
| 8,458,197 B1 | 6/2013 | Procopio | |
| 8,762,482 B2 | 6/2014 | Raghunthan et al. | |
| 8,898,568 B2 | 11/2014 | Bull et al. | |
| 9,124,642 B2 | 9/2015 | Choudhury et al. | |
| 9,379,933 B1 | 6/2016 | Bishop | |
| 9,414,222 B1 | 8/2016 | Dixon | |
| 9,462,313 B1 | 10/2016 | Sbaiz et al. | |
| 9,544,388 B1* | 1/2017 | Li | H04L 67/535 |
| 9,552,188 B1 | 1/2017 | Qureshey et al. | |
| 9,742,861 B2 | 8/2017 | Harrang et al. | |
| 9,742,871 B1 | 8/2017 | Gibson et al. | |
| 9,819,978 B2 | 11/2017 | Park et al. | |
| 9,905,226 B2 | 2/2018 | Bishop et al. | |
| 10,136,380 B2* | 11/2018 | Gibbon | H04L 65/762 |
| 10,389,838 B2 | 8/2019 | Lei | |
| 11,334,315 B2 | 5/2022 | Bromand et al. | |
| 11,755,283 B2 | 9/2023 | Bromand et al. | |
| 2002/0045960 A1 | 4/2002 | Phillips et al. | |
| 2005/0062935 A1 | 3/2005 | Bubie et al. | |
| 2006/0095848 A1 | 5/2006 | Naik | |
| 2007/0074617 A1 | 4/2007 | Vergo | |
| 2008/0208379 A1 | 8/2008 | Weel | |
| 2009/0076821 A1 | 3/2009 | Brenner et al. | |
| 2010/0064218 A1 | 3/2010 | Bull et al. | |
| 2010/0240346 A1 | 9/2010 | Jain et al. | |
| 2011/0234480 A1 | 9/2011 | Fino et al. | |
| 2012/0147742 A1* | 6/2012 | Kitamori | H04L 43/0805 |
| | | | 370/225 |
| 2013/0024195 A1 | 1/2013 | White et al. | |
| 2013/0138440 A1 | 5/2013 | Strope et al. | |
| 2014/0095943 A1* | 4/2014 | Kohlenberg | H04L 67/5681 |
| | | | 714/E11.179 |
| 2014/0278419 A1 | 9/2014 | Bishop et al. | |
| 2015/0268800 A1 | 9/2015 | O'Konski et al. | |
| 2015/0281303 A1* | 10/2015 | Yousef | H04N 21/26258 |
| | | | 709/219 |
| 2016/0191650 A1 | 6/2016 | Rong | |
| 2016/0248704 A1* | 8/2016 | Soelberg | H04L 67/30 |
| 2017/0032256 A1 | 2/2017 | Otto et al. | |
| 2017/0243576 A1 | 8/2017 | Millington et al. | |
| 2018/0188945 A1 | 7/2018 | Garmark et al. | |
| 2019/0095786 A1 | 3/2019 | Carbune | |
| 2019/0324940 A1* | 10/2019 | Hofverberg | H04L 67/5681 |
| 2019/0342419 A1 | 11/2019 | Bromand | |
| 2023/0123322 A1* | 4/2023 | Cella | G06Q 10/067 |
| | | | 700/29 |

FOREIGN PATENT DOCUMENTS

| | | |
|---|---|---|
| WO | 2007/022533 | 2/2007 |
| WO | 2017214408 | 12/2017 |

OTHER PUBLICATIONS

Al-Molegi et al., "STF-RNN: Space Time Features-based Recurrent Neural Network for predicting people next location", 20th IEEE Symposium Series on Computational Intelligence (SSCI), Dec. 6, 2016, pp. 1-7.
Borkowski, Michael, et al., "Prediction-Based Prefetch Scheduling in Mobile Service Applications", 2016 IEEE International Conference on Mobile Services, pp. 41-48.
European Communication in Application 1817070.1, mailed Apr. 23, 2019, 4 pages.
European Communication in Application 181704 70.1, mailed Jul. 23, 2019, 4 pages.
European Communication in Application 18170470.1, mailed Jan. 17, 2019, 9 pages.
European Extended Search Report in Application 20165133.8, mailed Jan. 12, 2021, 10 pages.
European Extended Search Report in Application 18170470.1, mailed Oct. 5, 2018, 11 pages.
European Invitation Pursuant to Rule 63(1) EPC in Application 20155133.8, mailed Aug. 28, 2020, 3 pages.
European Invitation Pursuant to Rule 63(1) EPC in Application 20155133.8, mailed Jun. 16, 2020, 3 pages.
Kumar, Muthukumar, "How Google is planning to use your location to create the perfect playlist", GEOawesomeness, Nov. 15, 2016. Available at: http://geoawesomeness.com/google-planning-use-location-create-perfect-playlist/, 3 pages.
Hochreiter, Sepp, et al., "Long Short-Term Memory", Neural Computation, vol. 9, No. 8, Nov. 15, 1997, pp. 1735-1780.
Yam, Marcus, "The Next Chrome Will Load Your Next Link for You", Tom's Guide, Jun. 17, 2011. Available at: https://NWW.tomsguide.com/us/chrome-preloading-links-google-search.news-11537.html, 2 pages.
European Communication pursuant to Article 94(3) EPC in Application 20165133.8, mailed Jul. 17, 2023, 7 pages.
European Decision to Refuse the Application in Application 18184291.5, dated Dec. 23, 2022, 1 page.
European Office Action for EP Application 18184291.5, mailed Jul. 2, 2021, 16 pages.
European Summons to Attend Oral Proceedings in Application 18184291.5, dated Nov. 21, 2022, 17 pages.
Mallory Locklear, "Alexa can now play that song you heard but can't remember the name of", engadget (Mar. 8, 2018), available online at: https://www.engadget.com/2018/03/08/alexa-play-song-cant-remember-name-of-/, 2 pages.

* cited by examiner

Location Data 1912

| Index | 0 | ... | 4 | 5 | 6 | ... | 18 | 19 | 20 | ... | 23 | 24 |
|---|---|---|---|---|---|---|---|---|---|---|---|---|
| Value | 0 | ... | 0 | 1 | 0 | ... | 0 | 0 | 0 | ... | 0 | 0 |

*FIGURE 21*

Predicted Destination 1932

| Index | 0 | ... | 4 | 5 | 6 | ... | 18 | 19 | 20 | ... | 23 | 24 |
|---|---|---|---|---|---|---|---|---|---|---|---|---|
| Value | 0 | ... | 0 | 0 | 0 | ... | 0 | 1 | 0 | ... | 0 | 0 |

*FIGURE 22*

PREDICTIVE CACHING

CROSS-REFERENCE TO RELATED APPLICATION

This application is a continuation of U.S. application Ser. No. 16/372,495, which was filed on Apr. 2, 2019, and which claims benefit of priority to European Patent Application No. 18170470.1, which was filed on May 2, 2018, with title "PREDICTIVE CACHING", and which are incorporated herein by reference.

TECHNICAL FIELD

The present disclosure relates to technical solutions for media content item caching and, more specifically, predictive media content item caching.

Systems, devices, apparatuses, components, methods, and techniques for predicting user and media-playback device states are disclosed. Systems, devices, apparatuses, components, methods, and techniques for media content item caching on a media-playback device are also disclosed. Furthermore, systems, devices, apparatuses, components, methods, and techniques for predicting a destination are disclosed.

BACKGROUND

Many people enjoy consuming media content while traveling or during other activities. The media content can include audio content, video content, or other types of media content. Examples of audio content include songs, albums, podcasts, audiobooks, etc. Examples of video content include movies, music videos, television episodes, etc. Using a mobile phone or other media-playback device, such as a vehicle-integrated media-playback device, a person can access large catalogs of media content. For example, a user can access an almost limitless catalog of media content through various free and subscription-based streaming services. Additionally, a user can store a large catalog of media content on his or her mobile device. The ability of media-playback devices to store content has increased, but the amount of available media content far exceeds the storage capabilities of media-playback devices. This creates difficulties when a device receives a request to play a media content item that is not stored on the device at a time when it is difficult for a user to access media content.

This nearly limitless access to streaming media content introduces new challenges for users. Although streaming content allows a device to access a vast catalog of content that is much larger than the device can physically store locally, streaming media content requires a sufficiently strong network connection. During traveling, areas of connectivity gaps or poor quality connection limit the ability to receive streaming media content. While devices enable users to manually download content to the device for later offline playback, it can be difficult for users to predict which content they would like to play in the future. Further, being a manual process, some users may simply not download content to the device. Some automated caching protocols attempt to automate the caching process by holding a first-in-first-out queue of previously played content, or by fetching the next content in a current context (e.g., the next song in a currently playing album). While this automated caching can help, such rudimentary processes have poor cache efficiency and can waste bandwidth, storage, and battery resources. In addition, unnecessarily high resource consumption can be detrimental to the environment. Challenges remain in determining what to cache, how much to cache, and how to handle limited memory space.

US 2011/0167128 describes identifying a dead spot region within an expected route of a vehicle, and accessing audio and/or video content such that playing of the content is uninterrupted within the dead spot region.

US 2017/0032256 describes predicting a future event at which media is to be played and whether a communications network connection will be available at locations of the predicted future event. The publication further describes downloading media from a generated playlist when it is predicted that the communications network connection will be unavailable or intermittent at the one or more locations.

US 2017/0142219 describes client-side predictive caching of content by predictively caching a content item before use of the content item commences. The various resources can be initialized by the client to facilitate use of the content item. The cache is divided into multiple segments with various content selection criteria.

SUMMARY

It is in view of the above considerations and others that the various embodiments disclosed throughout this disclosure have been made.

It is a general object of the embodiments described herein to allow for improved media content item caching.

In general terms, this disclosure is therefore directed to media content item caching. Various aspects are described in this disclosure, which include, but are not limited to, a media-playback device that predicts one or more future states of the device, and updates caching parameters based on properties of the one or more future states. Other aspects include the following:

In an example, there is a method of media content item caching on a media-playback device. The method includes: obtaining destination data that specifies a destination of the media-playback device; obtaining route data that specifies a route from a current location of the media-playback device to the destination of the media-playback device; obtaining at least one connectivity map based on the route data; determining area data based on the at least one connectivity map and the route data, wherein the area data specifies one or more areas of limited network connectivity; generating, based on the area data, identifier data that identifies one or more media content items to be played during the one or more areas of limited network connectivity; caching, at the media-playback device, the one or more media content items using the identifier data. Obtaining the destination data includes: obtaining input data from the media-playback device; providing the input data as input to a destination prediction engine having a neural network trained to predict a destination; and obtaining the destination as output from the destination prediction engine.

In an example, providing the input data as input to the destination prediction engine includes: determining, based on the input data, a sub-region in which the media-playback device is located; and providing an identifier of the sub-region as the input to the destination prediction engine.

In an example, the neural network is a long short-term memory recurrent neural network and providing the identifier of the sub-region as the input to the destination prediction engine includes: formatting the sub-region as a one-hot vector; and providing the one-hot vector as the input to the long short-term memory recurrent neural network. In an example, providing the input data as input to the destination prediction engine includes: providing location data and bearing data, and altitude data of the media-playback device as the input to the neural network. In an example, providing the input data as input to the destination prediction engine includes: providing the input data as input to the neural network, wherein the neural network is trained to predict a destination for a particular user based on training data regarding the particular user. In an example, providing the input data as input to the destination prediction engine includes: providing the input data as input to the neural network, wherein the neural network is trained to predict a destination for a particular region based on training data of a plurality of aggregated users. In an example, providing the input data as input to the destination prediction engine includes: providing the input data as input to the neural network, wherein the neural network is trained to predict a destination based on training data of a plurality of aggregate users and a particular user. In an example, obtaining the connectivity map comprises selecting the connectivity map from a plurality of connectivity maps based in part on a time of day and a day of the week. In an example, predicting the one or more media content items to be played during the one or more areas of limited network connectivity includes: obtaining time data that includes a start time of a period of limited network connectivity and an end time of the period of limited network connectivity. In an example, predicting the one or more media content items to be played during the one or more areas of limited network connectivity further includes: determining a current position in a currently playing media content item context of the media-playback device; determining a future position in the currently playing media content item context that will be playing between the start time of the period of limited network connectivity and the end time of the period of limited network connectivity; and caching a media content item that is scheduled to be played at the future position in the currently playing media content item context. In an example, predicting the one more media content items to be played during the one or more areas of limited network connectivity includes: obtaining device-specific media content item consumption data for the device; determining a group of devices based on the media content item consumption data; and extracting the one or more media content items based on the group, thereby predicting the one more media content items to be played during the one or more areas of limited network connectivity. In an example, extracting the one or more media content items based on the group includes selecting a number of most-played media content items for the group. In an example, determining the group of devices includes based on the media content item consumption data includes: determining a similarity in media content item context consumption among the devices over a predefined period of time. In an example, obtaining the destination of the media-playback device includes, prior to providing the input data as input to the destination prediction engine: determining whether a known destination is available from a mapping application operating on the media-playback device; and determining that the known destination is not available from the mapping application.

In an example, there is a system that includes: one or more processing devices; and a memory device coupled to the one or more processing devices and storing instructions thereon that, when executed by the one or more processing devices, cause the one or more processing devices to perform any of the previously described methods.

Various embodiments described herein are advantageous in that they allow for improved media content item caching. For example, media content item caching on a media-playback device can be made predictive. That is, a media-playback device can be operable to predict one or more future states of the device, and update caching parameters based on properties of the one or more future states. This enables a more efficient usage of internal resources of the media-playback device (e.g., processor, and battery resources) and/or external resources (e.g., networking resources). An increasingly intelligent usage of resource may, in turn, be beneficial for the environment. The improved media content caching may also assists a user of the media-playback device to operate his/her media-playback device in a better way, which, in turn, may improve the user's experience of operating the media-playback device. Furthermore, using the resources of the media-playback device more intelligently may have the advantageous effect that the technical lifetime of the media-playback device may be extended or otherwise prolonged.

BRIEF DESCRIPTION OF THE DRAWINGS

FIG. 21 illustrates an example form of location data.
FIG. 22 illustrates an example form of destination data.

DETAILED DESCRIPTION

Figure 1:
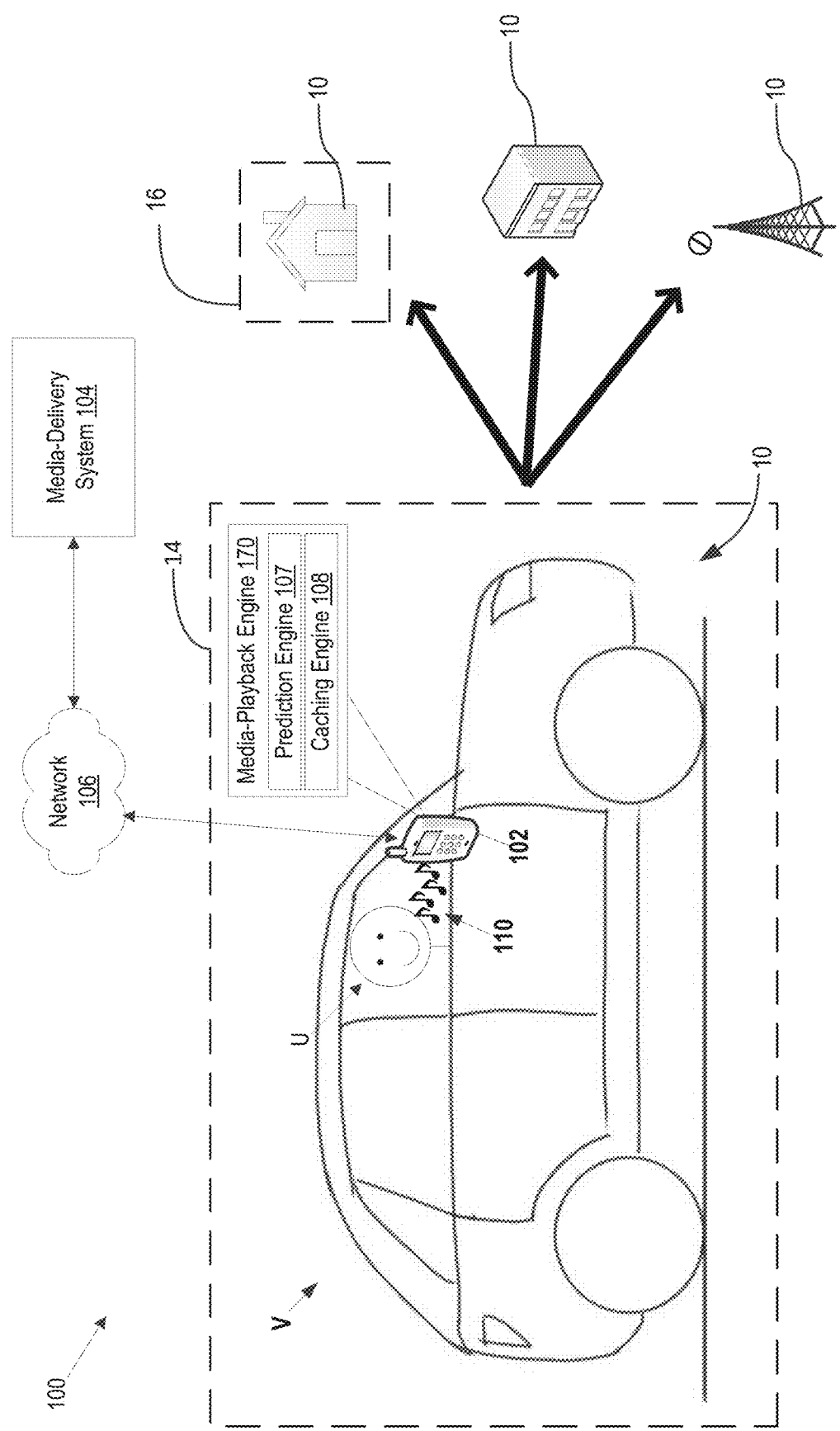
FIG. 1 illustrates an example system for media content caching and state prediction.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting, and merely set forth some of the many possible embodiments for the appended claims.

Mobile phones, tablets, computers, speakers, vehicle-based personal media streaming appliances, and other devices or systems can be used as media-playback devices to consume media content. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, traveling (and, in particular, driving) is described as one example of an activity during which media content is consumed. However, it should be understood that the same concepts are similarly applicable to other forms of media consumption and to other activities, and at least some embodiments include other forms of media consumption and/or are configured for use during other activities.

Users often consume media content during various activities, which can be described as the users being in particular states. Here, the term "state" and its variants refer to a particular condition that a user and/or media-playback device is in at a particular time. For example, while at home, the user can be described as being in a "home state". While at work, the user can be described as being in a "work state". States need not be limited to location of the user. They can also describe an activity the user is performing (e.g., an exercising state, a studying state, a cooking state, etc.), a condition of the media-playback device (e.g., Internet connectivity, Internet connectivity speed, Internet connectivity cost, Internet connectivity level, Internet connectivity type, Internet connectivity reliability, or battery level, storage space, etc.), and so on. There can be more than one state at a time. For example, while a user is cooking dinner at home and charging the media-playback device, there can simultaneously be a home state, a cooking state, and a charging state. Each state can carry its own characteristics. For example, a home state may indicate that the media-playback device has strong Internet connectivity. As another example, an exercise state may indicate that the user may want to listen to a particular kind of music. The characteristics of states can be unique to a user (e.g., one user may have a strong Internet connection at work while another has a weak connection) or can be shared by users (e.g., users in a home state tend to have strong Internet connections).

Different states can present different challenges to enjoying media content. For example, enjoying media content while traveling can present several challenges. First, it can be difficult to safely interact with a media-playback device while in certain states, such as in a travel state where interactions with a media-playback device can interfere with travel related activities (e.g., driving, navigating, etc.). Second, desired media content may not be available or accessible in a format that can be accessed while in certain states. For example, streaming media content can be unavailable in states with low or no Internet connectivity. Third, accessing media content while traveling may be difficult, expensive, or impossible, depending on network availability/capacity in a particular state. For example, along a route of travel, Internet connectivity may be inconsistent. Fourth, accessing and playing back media content can require significant amounts of energy, potentially draining a battery in the media-playback device. Fifth, it can be challenging to connect a media-playback device to an audio system for playback in certain states. For example, in a travel state, it can be difficult for a media-playback device to connect to a vehicle-embedded audio system. Embodiments disclosed herein address some or all of these challenges. It should be understood, however, that aspects described herein are not limited to use during, or with reference to, particular states.

Knowing the current state of a user can be helpful in providing an improved user experience. For example, by knowing the state of the user, media-playback device, or system, media content items can be selected according to what the user may prefer during that particular state. As another example, knowing that a state has (or tends to have) particular characteristics, the media-playback device can leverage those characteristics to provide an improved user experience. For instance, knowing that a user often plays media content items using a high-quality stereo system while at home (e.g., in a home state), the media-playback device can increase the quality at which it streams media content items in order to take advantage of the available high-quality stereo system.

It can also be advantageous for a media-playback device to anticipate what kind of state will exist in the near future. Data mining, data analysis, machine learning, and other techniques can be used to intelligently pre-load content for the user to enjoy while in particular future states. The media-playback device can take steps to prepare a positive user experience for that state, such as by curating or otherwise managing a content cache for that state. For example, a media-playback device may predict that the user will enter a travel state, and select media content items that the user may want to play during that state. These selected media content items can then be proactively cached to the device and already-cached content can be preserved. If the user then requests that these media content items be played in the future state, then the media-playback device can respond to the request using fewer resources (e.g., networking, processor, and battery resources). Using fewer resources may in turn allow for an improved user experience. Furthermore, using fewer resources may have the advantageous effect that the technical lifetime of the media-playback device may be extended or otherwise prolonged.

It can also be advantageous for a user to be able to play media content items stored on a device while in a state having limited network connectivity. During limited network connectivity, playback can be limited to media content items stored locally on the media-playback device because network resources are too limited to, for example, stream media content items from a remote device or server. Media-playback devices can give users the option of selecting media content items for storage on the playback device, so that the items are available for playback directly from the device. Media-playback devices can also cache media content items as part of the playback process. For example, the media-playback device can store recently-played media content items in a cache so that the cached media content item can be readily played at a later time. However, traditional media-playback devices do not allow users to play back cached media content items while in offline state.

In view of the above discussion, it should be appreciated that various embodiments described in this disclosure are advantageous in that they allow for improved media content item caching. For example, a media-playback device can be operable to predict one or more future states of the device, and update caching parameters based on properties of the one or more future states. This enables a more efficient usage of internal resources of the media-playback device (e.g., processor, and battery resources) and/or external resources (e.g., networking resources). An increasingly intelligent usage of resource may, in turn, be beneficial for the environment. The improved media content caching may also assists a user of the media-playback device to operate his/her media-playback device in a better way, which, in turn, may improve the user's experience of operating the media-playback device. In addition, using the resources of the media-playback device more intelligently may have the advantageous effect that the technical lifetime of the media-playback device may be extended or otherwise prolonged Media Content Playback System for Media Content Caching FIG. 1 illustrates an example media content playback system 100 for media content caching and state prediction using a media-playback device 102. The example system 100 can also include a media-delivery system 104. The media-playback device 102 includes a media-playback engine 170 having a prediction engine 107 and a caching engine 108. The components of the system 100 communicate across a network 106.

At a particular time, the media content playback system 100, media-playback device 102, and a user U can be considered as being in a particular state 10. The state 10 reflects the particular condition that the user, media-playback device, or system is in at a specific time. A state 10 at current moment can be referred to as a current state 14. As illustrated in the example of FIG. 1, the user U is traveling in a vehicle V, and the current state 14 can be considered a travel state. States 10 can be transitory, and another state 10 can follow the current state 14. The state 10 that is predicted to follow the current state 14 can be considered a predicted future state 16. As illustrated, the current state 14 is a travel state and a predicted future state 16 is a home state 10 (e.g., the user is predicted to be driving home), with other potential states 10 being a work state 10 (e.g., the user is driving to work) and a limited network connectivity state 10 (e.g., the media-playback device 102 will lose its Internet connection). The predicted future state 16 may not be able to be predicted with certainty, so other states 10 may also be possible.

The media-playback device 102 plays back media content items to produce media output 110. In some embodiments, the media content items are provided by the media-delivery system 104, and transmitted to the media-playback device 102 using the network 106. A media content item is an item of media content including audio, video, or other types of media content that may be stored in any format suitable for storing media content. Non-limiting examples of media content items include songs, albums, audiobooks, music videos, movies, television episodes, podcasts, other types of audio or video content, and portions or combinations thereof.

The media-playback device 102 plays media content for the user. The media content that is played back may be selected based on user input or may be selected without user input. The media content may be selected for playback without user input by either the media-playback device 102 or the media-delivery system 104. For example, media content can be selected for playback without user input based on stored user profile information, location, particular states, current events, and other criteria. User profile information includes, but is not limited to, user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Where user data is used, it can be handled according to a defined user privacy policy, and can be used to the extent allowed by the user. Where the data of other users is used, it can be handled in an anonymized matter so that the user does not learn the details of other users generally or specifically. Although the media-playback device 102 is shown as a separate device in FIG. 1, the media-playback device 102 can also be integrated with the vehicle V (e.g., as part of a dash-mounted vehicle infotainment system).

The media-playback engine 170 selects and plays back media content, and generates interfaces for selecting and playing back media content items. In some examples, a user can interact with the media-playback engine 170 over a limited-attention user interface that requires less attention from the user and/or is less distracting than a standard interface. This limited-attention interface can be useful during travel states because a user may have limited attention available for interacting with a media-playback device due to the need to concentrate on travel-related activities, including, for example, driving and navigating. But the limited-attention interface can also be configured for use in playing back media content during states 10 that require the user's concentration (e.g., exercising, playing games, operating heavy equipment, reading, studying, etc.). The media-playback engine can include a limited-attention media-playback engine that generates interfaces for selecting and playing back media content items. In at least some embodiments, the limited-attention media-playback engine generates interfaces that are configured to be less distracting to a user and require less attention from the user than a standard interface.

The prediction engine 107 can make predictions regarding states 10. For example, the prediction engine 107 can predict one or more current states 14 for the user, system 100, and/or media-playback device 102. The prediction engine 107 can also make predictions regarding one or more predicted future states 16. The predicted future states 16 can be states that the device will enter after the current state 14, or will enter within a threshold amount of time (e.g., within 30 minutes, 1 hour, 12 hours, 24 hours). The caching engine 108 curates a cache of the media-playback device 102. For example, the caching engine 108 can modify or delete cached data. The caching engine 108 can also fetch or receive data to be placed in the cache. The caching engine can retrieve and check the status of cached data (e.g., for playback). The caching engine can perform these or other cache operations periodically, related to the occurrence of an event, upon request (e.g., by the user or a software process), or at another time. The prediction engine 107 and the caching engine 108 can cooperate to provide an improved user experience as the user transitions from state to state.

Figure 2:
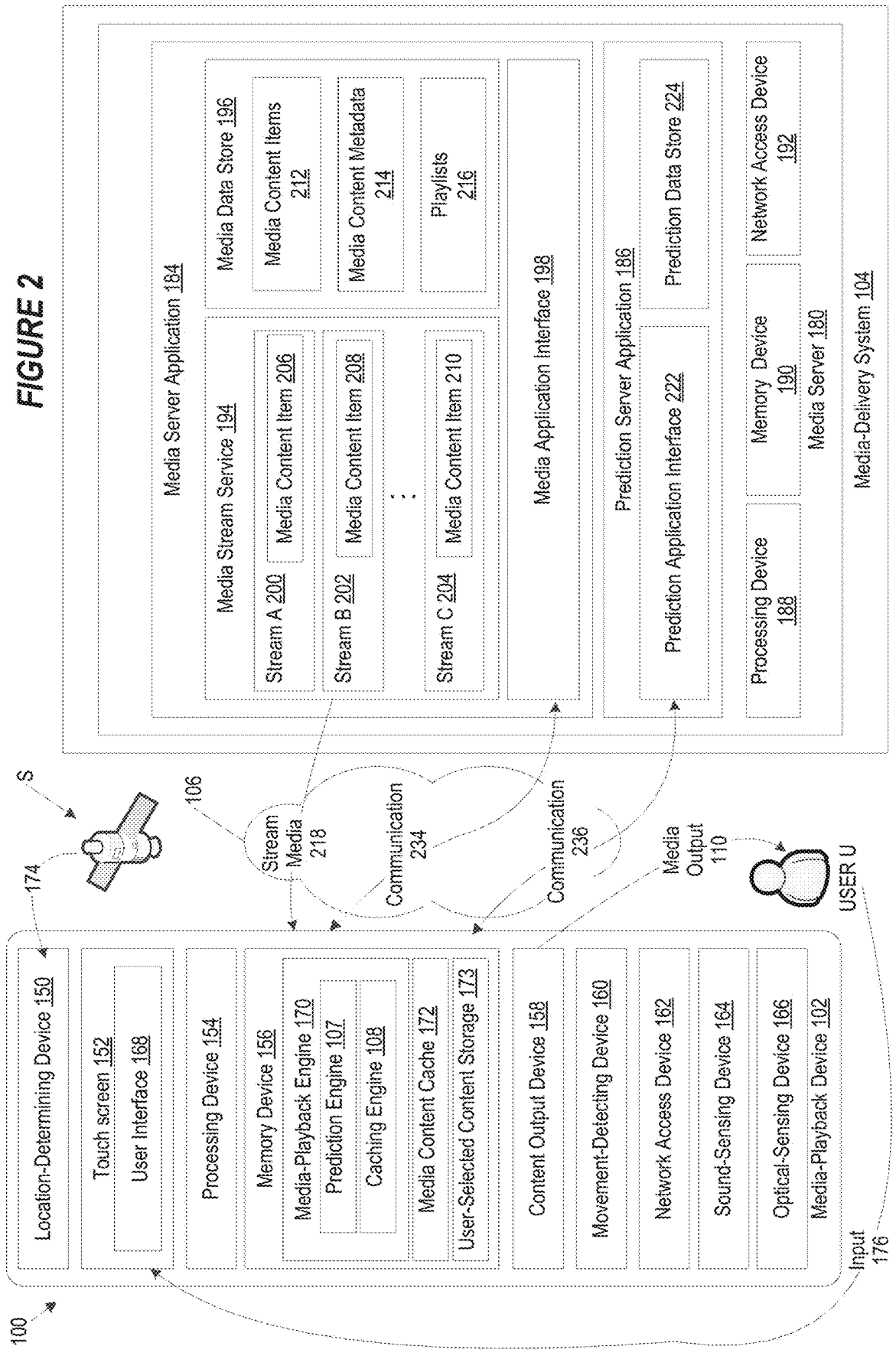
FIG. 2 is a schematic illustration of the example system of FIG. 1.

FIG. 2 is a schematic illustration of another example of the system 100 for media content caching and state prediction. In FIG. 2, the media-playback device 102, the media-delivery system 104, and the network 106 are shown. Also shown are the user U and satellites S.

As noted above, the media-playback device 102 plays media content items. In some embodiments, the media-playback device 102 plays media content items that are provided (e.g., streamed, transmitted, etc.) by a system external to the media-playback device such as the media-delivery system 104, another system, or a peer device. Alternatively, in some embodiments, the media-playback device 102 plays media content items that are stored locally on the media-playback device 102. Further, in at least some embodiments, the media-playback device 102 plays media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, Blu-ray® disc or DVD player, media player, stereo system, smart speaker, Internet-of-things device, vehicle-based personal media streaming appliance, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the location-determining device 150, the touch screen 152, the sound-sensing device 164, and the optical-sensing device 166.

The location-determining device 150 is a device that determines the location of the media-playback device 102. In some embodiments, the location-determining device 150 uses one or more of the following technologies: Global Positioning System (GPS) technology that may receive GPS signals 174 from satellites S, cellular triangulation technology, network-based location identification technology, WI-FI positioning systems technology, and combinations thereof.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 168 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154, additionally or alternatively, includes one or more digital signal processors, field-programmable gate arrays, or other electronic circuits.

The memory device 156 operates to store data and instructions. In some embodiments, the memory device 156 stores instructions for a media-playback engine 170 that includes the prediction engine 107 and the caching engine 108.

Some embodiments of the memory device 156 also include a media content cache 172. The media content cache 172 stores media-content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media-content items such as title, artist name, album name, length, genre, mood, or era. The media content cache 172 can also store playback information about the media content items, such as the number of times the user has requested playback of the media content item, or the current location of playback (e.g., when the media content item is an audiobook, podcast, or the like, for which a user may wish to resume playback). Media content items stored in the content cache 172 may be stored in a manner that makes the cached media content items inaccessible or not readily accessible to a user. For example, the cached media content items can be stored in a sandboxed memory space for the media-playback engine 170 (e.g., space in memory generally private to the media-playback engine 170). In another example, the cached media content items may be stored in a format that is understandable by the media-playback engine 170, but is obfuscated or not readily understandable by the user or other programs. For example, the cached media content items may be encrypted, and the media-playback engine 170 can cause the media content items to be decrypted, but a user is not readily able to cause the media content items to be decrypted (e.g., the user lacks a decryption key). In another example, the cached media content items may be stored in a format such that the user would need to convert the cached media content items to a different format before playing the media content items, using something other than the media-playback engine 170. For instance, the cached media content items may be stored in a proprietary format playable by the media-playback engine 170, but the user would need to convert the file into a different format in order to play the media content items. In another example, one or more file attributes associated with the media content cache 172 can be set to permit access by the media-playback engine 170 but prevent access by others.

Some embodiments of the memory device 156 also include user-selected content storage 173. The user-selected content storage 173 stores media-content items selected by the user for storage on the media-playback device. The media-playback device 102 may support receiving media content items from another user device for storage in the user-selected content storage 173. For example, the user may connect the media-playback device 102 to a computer, and transfer media content items from the computer to the user-selected content storage 173 for later playback. The media-playback device 102 may also support downloading media content items from the media-delivery system 104 to the media-playback device 102 for storage in the user-selected content storage 173. For example, the user may download media content items from a cloud-based content library for local storage and playback. The media-playback device 102 may also use the user-selected content storage 173 to store content that the user generated with the media-playback device 102. For example, the user may record video or mix a song using the media-playback device 102, and have the content stored in the user-selected content storage 173. In some examples, in contrast to the content cache 172, some or all of the media content items stored in the user-selected content storage 173 may, but need not, be readily accessible to the user. For example, the media content items in the user-selected content storage 173 may be stored in a location readily accessible to the user using a file manager (e.g., the user-selected content storage 173 is not in a private or sandboxed memory space).

While cached media content items and user-selected media content items may be stored separately in a respective media content cache 172 and user-selected content storage 173, they need not be. Instead, the items may be stored together, but flagged or otherwise distinguished.

The memory device 156 typically includes at least some form of computer-readable media. Computer-readable media include any available media that can be accessed by the media-playback device 102. By way of example, computer-readable media include computer-readable storage media and computer-readable communication media.

Computer-readable storage media include volatile and nonvolatile, removable and non-removable, media implemented in any device configured to store information such as computer-readable instructions, data structures, program modules, or other data. Computer-readable storage media include, but are not limited to, random access memory, read-only memory, electrically-erasable programmable read-only memory, flash memory and other memory technology, compact disc read-only memory, Blu-ray® discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer-readable storage media are non-transitory computer readable storage media.

Computer-readable communication media typically embody computer-readable instructions, data structures, program modules or other data in a modulated data signal such as a carrier wave or other transport mechanism and include any information delivery media. The term "modulated data signal" refers to a signal that has one or more of its characteristics set or changed in such a manner as to encode information in the signal. By way of example, computer-readable communication media include wired media, such as a wired network or direct-wired connection, and wireless media such as acoustic, radio frequency, infrared, and other wireless media. Combinations of any of the above are also included within the scope of computer-readable media.

The content output device 158 operates to output media content. In some embodiments, the content output device 158 generates media output 110 for the user U. Examples of the content output device 158 include a speaker assembly comprising one or more speakers, an audio output jack, a Bluetooth® transmitter, a display panel, and a video output jack. Other embodiments are possible as well. For example, the content output device 158 may transmit a signal through the audio output jack or Bluetooth® transmitter that can be used to reproduce an audio signal by a connected or paired device such as headphones, speaker system, or vehicle head unit.

The movement-detecting device 160 senses movement of the media-playback device 102. In some embodiments, the movement-detecting device 160 also determines an orientation of the media-playback device 102. In at least some embodiments, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret that acceleration as indicating movement of the media-playback device 102, too.

The network access device 162 operates to communicate with other computing devices over one or more networks, such as the network 106. Examples of the network access device include one or more wired network interfaces and wireless network interfaces. Examples of wireless network interfaces include infrared, Bluetooth® wireless technology, 802.11a/b/g/n/ac, and cellular or other radio frequency interfaces.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion-detection devices, storage devices, stand-alone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth®, ultra-wideband (UWB), 802.11, ZigBee®, cellular, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate to the media-playback device 102 (e.g., sounds within a vehicle in which the media-playback device 102 is located). In some embodiments, the sound-sensing device 164 comprises one or more microphones. For example, the sound-sensing device 164 may capture a recording of sounds from proximate to the media-playback device 102. These recordings may be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words. Additionally or alternatively, the sound-sensing device may determine various sound properties about the sounds proximate to the user such as volume, dominant frequency or frequencies, etc. These sound properties may be used to make inferences about the environment proximate to the media-playback device 102, such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate to the media-playback device 102. In some embodiments, the optical-sensing device 166 comprises one or more light sensors or cameras. For example, the optical-sensing device 166 may capture images or videos. The captured images can be processed (by the media-playback device 102 or an external server such as the media-delivery system 104 to which the images are transmitted) to detect gestures, which may then be interpreted as commands to change the playback of media content. Similarly, a light sensor can be used to determine various properties of the environment proximate to the user computing device, such as the brightness and primary frequency (or color or warmth) of the light in the environment proximate to the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, a prediction server application 186, a processing device 188, a memory device 190, and a network access device 192. The processing device 188, memory device 190, and network access device 192 may be similar to the processing device 154, memory device 156, and network access device 162, respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 170.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, and other information. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The prediction server application 186 provides prediction-specific functionality for providing media content items and interfaces for accessing media content items to media-playback devices. In some embodiments, the prediction server application 186 includes a prediction application interface 222 and a prediction data store 224.

The prediction application interface 222 can receive requests or other communication from media-playback devices or other systems, to retrieve prediction information and media content items for playback during predicted states. For example, in FIG. 2, the prediction application interface 222 receives communication 236 from the media-playback engine 170.

The prediction application interface 222 can also generate interfaces that are transmitted to the media-playback device 102 for use by the prediction engine 107 and/or the caching engine 108. In some embodiments, the prediction application interface 222 generates predictions of current states 14 or predicted future states 16.

Additionally, the prediction server application 186 can process data and user input information received from the media-playback device 102. In some embodiments, prediction server application 186 operates to transmit information about a prediction of one or more states 10, as well as the suitability of one or more media content items for playback during states. In some embodiments, the prediction server application 186 may provide a list of media content items that are suited to particular states, and the prediction server application 186 may cooperate with the caching engine 108 to curate the media content cache 172 based on media content items suited to particular states or other criteria.

For example, the prediction server application 186 may store metadata and other information that associates media content items with states 10 in the prediction data store 224. The prediction server application 186 may also store information that associates media content items with an individual or group of users' preferences for consuming that media content during particular states in the prediction data store 224. The prediction data store 224 may also store information that associates particular behavior with certain predicted current or future states based on actions of the current user or groups of other users. The prediction data store 224 may comprise one or more files or databases. The prediction data store 224 can also comprise files, tables, or fields in the media data store 196.

In some embodiments, the prediction data store 224 stores prediction media metadata. The prediction media metadata may include various types of information associated with media content items, such as the media content items 212. In some embodiments, the prediction data store 224 provides information that may be useful for selecting media content items for playback during particular states. For example, in some embodiments, the prediction data store 224 stores state scores for media content items that correspond to the suitability of particular media content items for playback during particular states. As another example, in some embodiments, the prediction data store 224 stores timestamps (e.g., start and end points) that identify portions of media content items that are particularly well-suited for playback during particular states.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for media-playback, other embodiments are possible as well. For example, in some embodiments, the media-playback device 102 includes a media data store 196 (e.g., the user-selected content storage 173 can act as a media data store 196) and the media-playback device 102 is configured to select and play back media content items without accessing the media-delivery system 104. Further, in some embodiments the media-playback device 102 operates to store previously streamed media content items in a local media data store (e.g., in the media content cache 172).

In at least some embodiments, the media-delivery system 104 can be used to stream, progressively download, or otherwise communicate music, other audio, video, or other forms of media content items to the media-playback device 102 for playback during travel on the media-playback device 102. In accordance with an embodiment, a user U can direct the input 176 to the user interface 168 to issue requests, for example, to select media content for playback during travel on the media-playback device 102.

Playing Media Content Items

Figure 3:
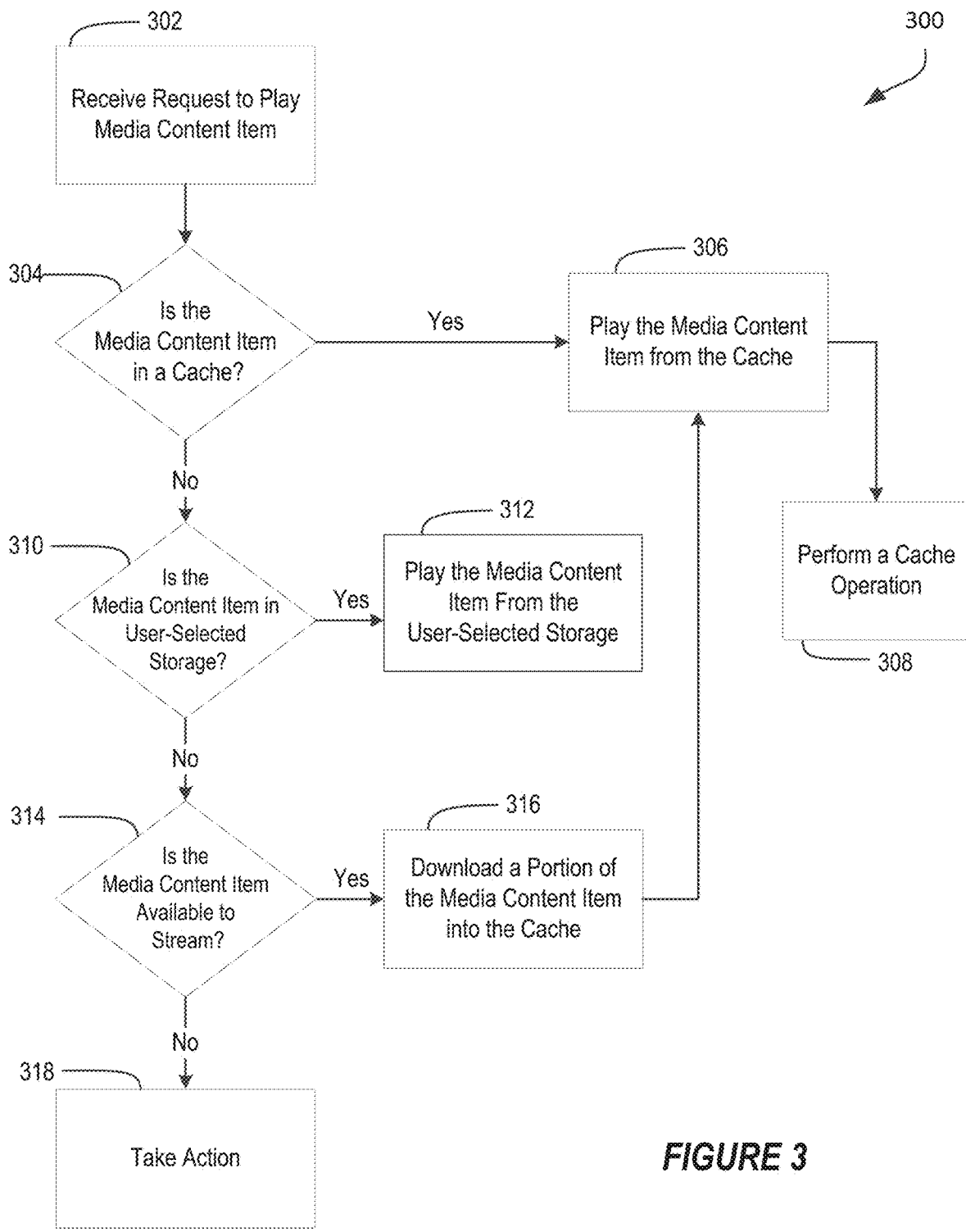
FIG. 3 is a block diagram illustrating an example process for playing media content items responsive to a user request.

FIG. 3 illustrates an example process 300 for playing media content items responsive to a user request. The media-playback engine 170 may use this process 300 to respond to a user's request to playback a media content item.

The process can begin with operation 302, which relates to receiving a request to play a media content item. In an example, the media-playback device may receive a request from a user to play a media content item. The media-playback device 102 may have a touch screen 152 displaying a user interface 168 and the user may make a selection on the user interface 168 to request playback of a media content item. The user may use a voice command to instruct the media-playback device 102 to play a media content item. In another example, the request need not come directly from a user. For instance, an application running on the media-playback device may request that a media content item be played (e.g., an alarm clock app may request that a song be played). As another example, the media-playback engine may be playing a playlist of media content items, and the request may be a request to play a next media content item in a playlist because the previous media content item has finished playing. Operation 302 can be followed by operation 304.

Operation 304 is a decision operation that relates to determining whether the media content item is in a cache. The media-playback device 102 can check whether the requested media content item is in the media content cache 172. This can be performed by, for example, using the caching engine 108 or another resource. If the media content item is located in the media content cache 172, the flow can move to operation 306. If the media content item is not located in the cache, the flow can move to operation 310.

Operation 306 relates to playing a media content item from the cache. The media-playback device can play the requested media content item from the cache. The media content item can be a whole media content item (e.g., a previously-cached media content item) or a partial media content item (e.g., a currently-streaming media content item). Operation 306 may be followed by operation 308.

Operation 308 relates to performing a cache operation. The caching engine 108 can perform an operation on the media content cache 172 according to caching preferences. For example, the caching engine 108 can remove the played media content item from the cache. The caching engine 108 may select a next media content item to cache. For example, if the played media content item is a first song in an album, the cache operation may fetch and cache the next song in the album.

Operation 310 is a decision operation that relates to determining whether the media content item is in user-storage. If it was determined in operation 304 that the media content item is not in a cache, the media-playback engine 170 can then determine whether the media content item is stored in user-selected content storage 173. If the media content item is stored in user-selected content storage 173, then the flow can move to operation 312. If the media content item is not stored in user-selected content storage 173, then the flow can move to operation 314.

Operation 312 relates to playing a media content item from user-selected storage. The media-playback device can play the requested media content item from the user-selected storage.

Operation 314 is a decision operation that relates to determining whether the media content item is available to stream. This can include querying the media-delivery system 104 to determine whether the media content item is available to stream. If the media content item is available for streaming, the flow may move to operation 316. If the media content item is unavailable for streaming, the flow may move to operation 318.

Operation 316 relates to downloading a portion of the media content item into the cache. This operation can include sending a request to the media-delivery system 104 to stream the media content item. The media server 180 may then transmit stream media 218 to the media-playback device 102, which may buffer, store, cache, or otherwise place at least a portion of the media content item into the media content cache 172 for playback. Following operation 316, the flow may move to operation 306 for playback of the media content item.

Operation 318 relates to taking an action responsive to determining that the media content item is neither in the media content cache 172 nor in the user-selected content storage 173, nor available to stream. The action can be providing notice to the user that the media content item is unavailable. The action can also be attempting to play a next media content item.

State Prediction and Caching

Figure 4:
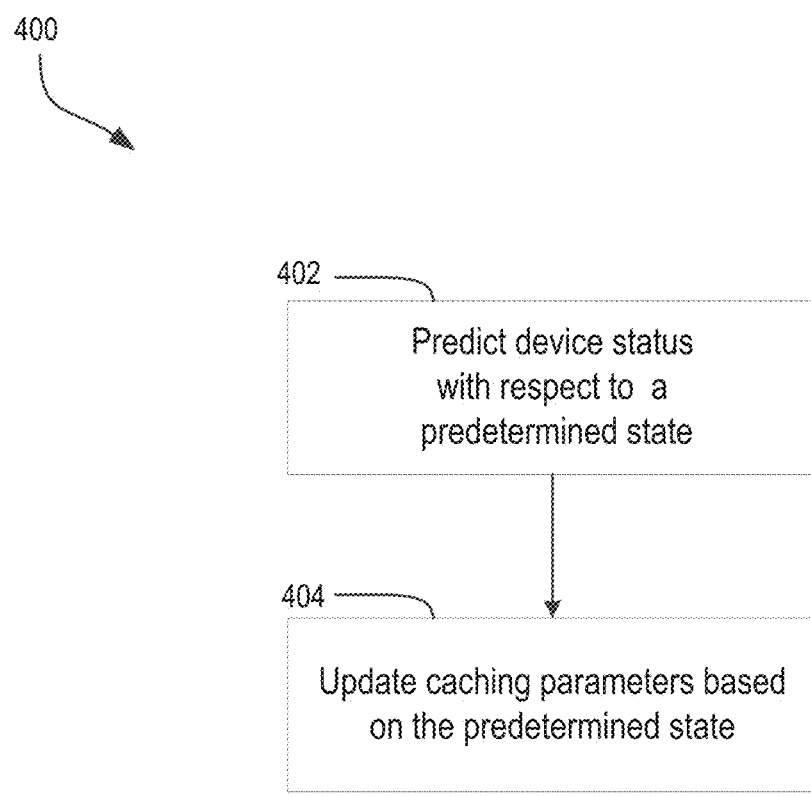
FIG. 4 is a block diagram illustrating an example process for updating caching parameters based on predicting a device status with respect to a predetermined state.

FIG. 4 is a block diagram illustrating an example process 400 for updating caching parameters based on predicting a device status with respect to a predetermined state. As previously described, predicting states 10, including a current state 14 and a predicted future state 16 can be relevant to improving user experience with a media-playback device. For example, by determining a next, predicted future state 16 and updating caching parameters based on the state. In this manner, the media-playback device may be able to play media content items from the cache rather than needing to stream the media content item from a media-delivery system 104, which can cause challenges.

Process 400 may begin with operation 402, which relates to predicting a device status with respect to a predetermined state. This can involve predicting one or more current states 14 of the system 100, the media-playback device 102 and/or the user. It can also involve predicting one or more next, predicted future states 16 of the media-playback device 102. This can also involve determining metadata regarding the state, which can include a confidence value for the prediction (e.g., confidence that the predicted current state accurately reflects the actual current state), as well as predictions regarding attributes, preferences, and other data regarding the user and/or the media-playback device 102. For example, the data may include a predicted Internet connection speed of the media-playback device in that state, what kinds of media content items the user will be interested in playing in that state, and other data. After operation 402, the flow may move to operation 404.

Operation 404 relates to updating caching parameters. The caching engine 108 may curate the media content cache 172 according to caching parameters. These parameters can be updated by the user or the media-playback device (e.g., an operating system of the media-playback device 102). These parameters can also be updated by media-playback engine 170, the prediction engine 107, and/or the caching engine 108 itself responsive to predicted current state 14 or a predicted future state 16. In another example, one or more of the caching parameters can be chosen by the user. For example, the user may set a maximum amount of local storage to be allocated for cached items. In another example, the user can specify particular settings for particular states. The caching engine 108 can then operate according to the updated parameters during its next cache operation.

Figure 5:
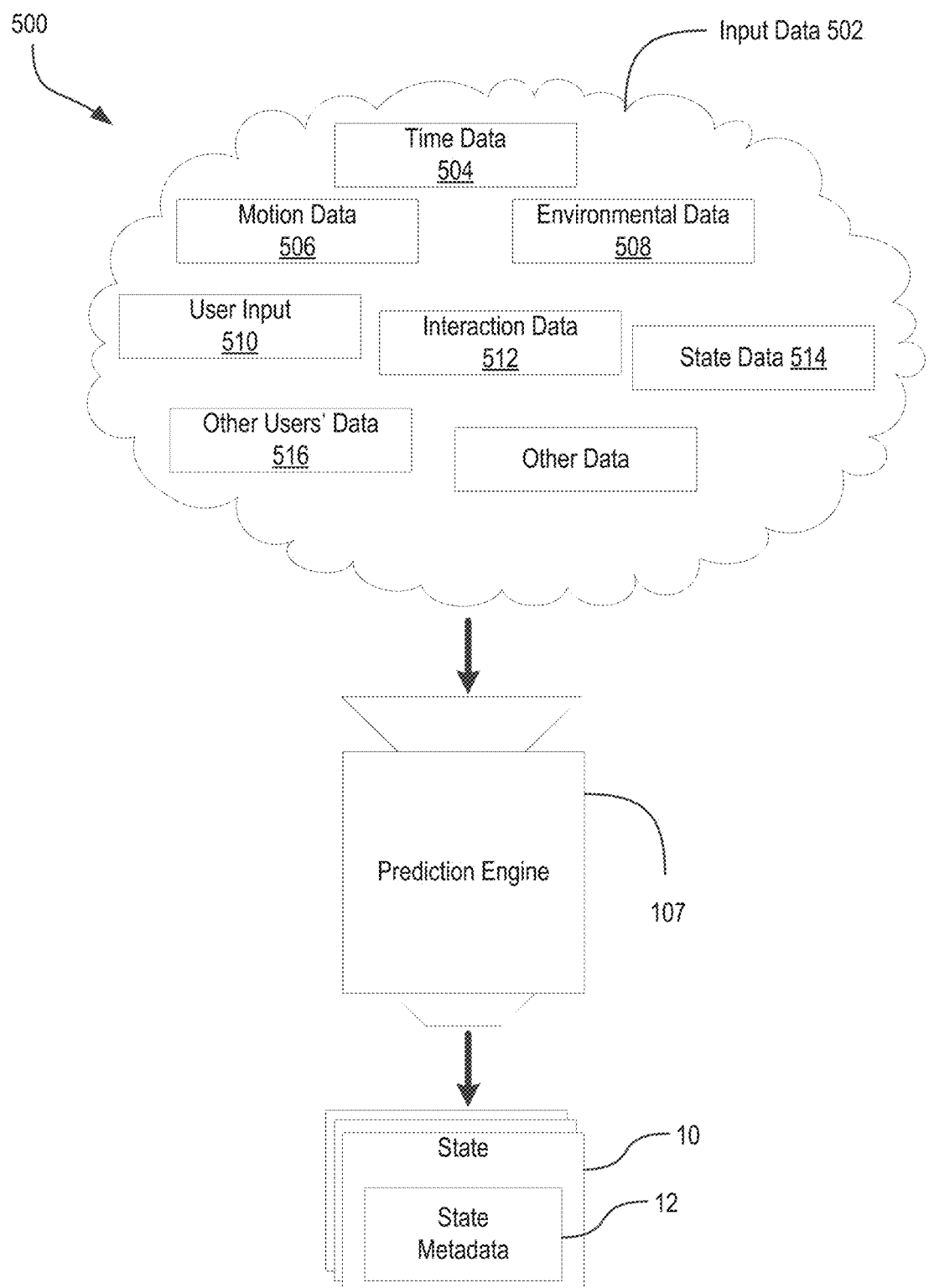
FIG. 5 is a block diagram illustrating an example process for predicting states.

FIG. 5 is a block diagram illustrating an example process 500 for predicting states 10. The process 500 can begin with receiving one or more items of input data 502 that can be used to predict a current or future state. The input data 502 can include, but need not be limited to, time data 504, motion data 506, environmental data 508, user input 510, interaction data 512, state data 514, and other users' data 516.

The time data 504 can include temporal information associated with the user or the media-playback device 102. Examples of time data 504 can include the current time of day, a duration that a user has been in a particular state, a media-playback device 102 power-on time, a time until a battery is charged or depleted, a time left in a work day, a screen-on time, a time until a particular event, an alarm clock setting, or other time information. For example, a time until a battery of the media-playback device 102 is depleted being less than a time until a next predicted state can indicate that the next state may be low-battery state rather than the previously predicted state.

Motion data 506 can include information associated with motion of the user or the media-playback device 102. Examples of the motion data 506 can include orientation, movement, acceleration, speed, attitude, rotation rates, vibration, data from the movement-detecting device 160, and other motion-related measurements of the media-playback device 102. For example, one or more of the motion data 506 can be used to determine that the media-playback device moves and stops repeatedly, which can suggest that the media-playback device 102 is placed on a bus, stopping at bus stops. This can indicate to the prediction engine 107 that the device is in a particular state (e.g., travel state, commuting state, bus travel state, etc.).

The environmental data 508 can include factors or information associated with the surroundings of the user or the media-playback device 102. Examples of the environmental data 508 include a current location, elevation, weather information, temperature, humidity, pressure, and any other information of the surroundings, such as ambient noise and light data. The environmental data 508 can include data from the network access device 162, data from the sound-sensing device 164, data from the optical-sensing device 166, data received from the media-delivery system 104. The environmental data 508 can also include nearby detected networks and devices. For example, environmental data 508 may include data indicating that the media-playback device 102 is in or passing through one or more different wireless networks (e.g., Wi-Fi® networks or cell towers), which can suggest that the media-playback device 102 is in a particular location or traveling in a particular direction.

The user input 510 includes historic or contemporaneous data received from the user. User input 510 can include answers received from a user, such as answers regarding predetermined states. For example, the user can be prompted to specify his or her current state, which can then allow the prediction engine 107 to determine that the user is in the specified state. As another example, the user can be prompted to provide scheduling information, such as when the user typically is commuting, at work, or at home. As another example, the user can be asked whether a prediction is correct. For example, the prediction engine 107 may predict that the user is in a given current state 14 or will soon enter a predicted future state 16. The user can be asked whether those predictions are correct, and the user's answers can be used to inform future predictions.

The interaction data 512 can include factors or information associated with user interaction with the media-playback device 102. Examples of the user interaction factors include information about a history or pattern of using a particular software program, such as a navigation application (e.g., Google® Maps, Microsoft® Bing™ Maps, or Apple® Maps), an online transportation network application (e.g., Uber® or Lyft®), and a public transit application; a time history or pattern of launching the software program; a period of time (duration) during which the software program is used; information on whether there has been no user input for a predetermined period of time; a history or pattern of searching, browsing, or playing back media content items or playlists thereof; a history of a user's social network activity; information about a user's calendar; and any other information involving user interaction with the media-playback device 102. By way of example, when it is detected that a navigation application is launched and used, the media-playback device 102 may be considered to be in a travel state. The interaction data 512 can further include data regarding an interaction between the media-playback device 102 and another device. Where the media-playback device 102 is connected to another device, information about that device (e.g., a name of the device) can be used as input data 502. As a particular example, where the media-playback device 102 provides output to a connected speaker named "Kitchen", such data can be provided as part of the input data 502. The prediction engine 107 can then use the data to infer that the user is in the kitchen and is in a state associated with a kitchen. As another example, where the media-playback device 102 is connected to a device having a vehicle name (e.g., paired to a Bluetooth® device having a name of a vehicle head unit), such data can be used by the prediction engine 107 to predict that a current state is one associated with a vehicle.

The state data 514 can include data relating to historic, current, or predicted future state data. State data 514 can include previous states 10 in which the user has been, the current state 14, metadata 12 regarding those states, and include input data 502 received before, during, or after those states 10. For example, historic state data may indicate that, during a typical work day, a pattern of user states includes a home state, a travel state, a work state, a travel state, and a home state. Based on that historic state data pattern, the prediction engine 107 may predict that a user will enter a travel state next if the user has already been in a home state, a travel state, and a work state that day.

The other users' data 516 can include data associated with users other than the user for which the state prediction is being made. The other users' data 516 can include current, past, or predicted future states of other users; metadata 12 regarding those states 10; and include input data 502 received before, during, or after those states 10. For example, if a user's current input data 502 is similar to the input data 502 of other users before they entered a travel state, the prediction engine 107 may also predict that the user will enter a travel state as well.

The input data 502 can then be used as input to the prediction engine 107. The prediction engine 107 can then use the input data 502 to produce one or more predictions with respect to a current state 14 or predicted future state 16 of the device, as well as metadata 12 regarding the state 10.

The prediction engine 107 can operate in a variety of ways. In an example, the prediction engine 107 may compare one or more of the input data 502 against a variety of criteria to arrive at one or more predicted states 10. For example, the prediction engine 107 can have a user-at-home criteria, which can be met if the user is located at home. This can involve comparing a user's current location to a predicted or known location destination (e.g., a predicted location or a known location) of the user's home to determine. A user that is within a threshold distance of the home location may be considered to be located at home and may meet that criteria. Meeting criteria can add a weight to a particular prediction (e.g., meeting the user-at-home criteria can add weight to the user being in a home state). Criteria can be built on other criteria.

Figure 7:
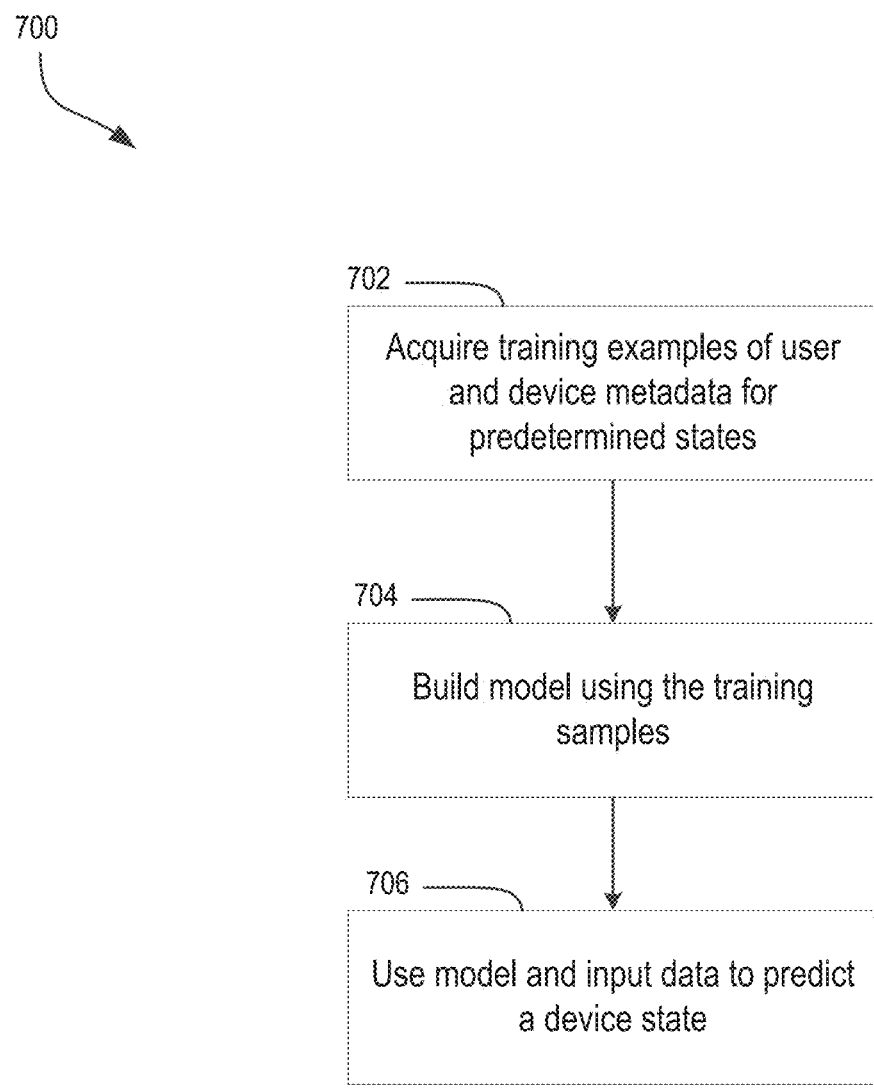
FIG. 7 is a block diagram illustrating an example process for predicting a state.

In another example, the prediction engine 107 can utilize one or more machine learning algorithms to arrive at a prediction (see, e.g., FIG. 7). In an example, predictions can be based on heuristics. Various states can be scored based on the input data 502. For example, input data 502, indicating that the user is moving, can add ten points to a score for a travel state, and subtract ten points from a score indicating that the user is in a home state. In an example, a predicted current state 14 or predicted future state 16 can be a state surpassing a threshold score or a state having a highest score.

In an example, the prediction engine 107 may have a list of pre-generated states (e.g., home, work, travel, etc.), assign a likelihood value to each state based on the input data 502 (e.g., a likelihood that the respective state is the current or predicted future state), and then produce a result set of the states and their likelihood. These pre-generated states may have respective default metadata. The default metadata may be based on observations of the current user, other users, other data, or combinations thereof. In another example, the prediction engine 107 may make predictions regarding specific metadata, and then package them together into a state or select a state based on the predicted metadata.

Figure 6:
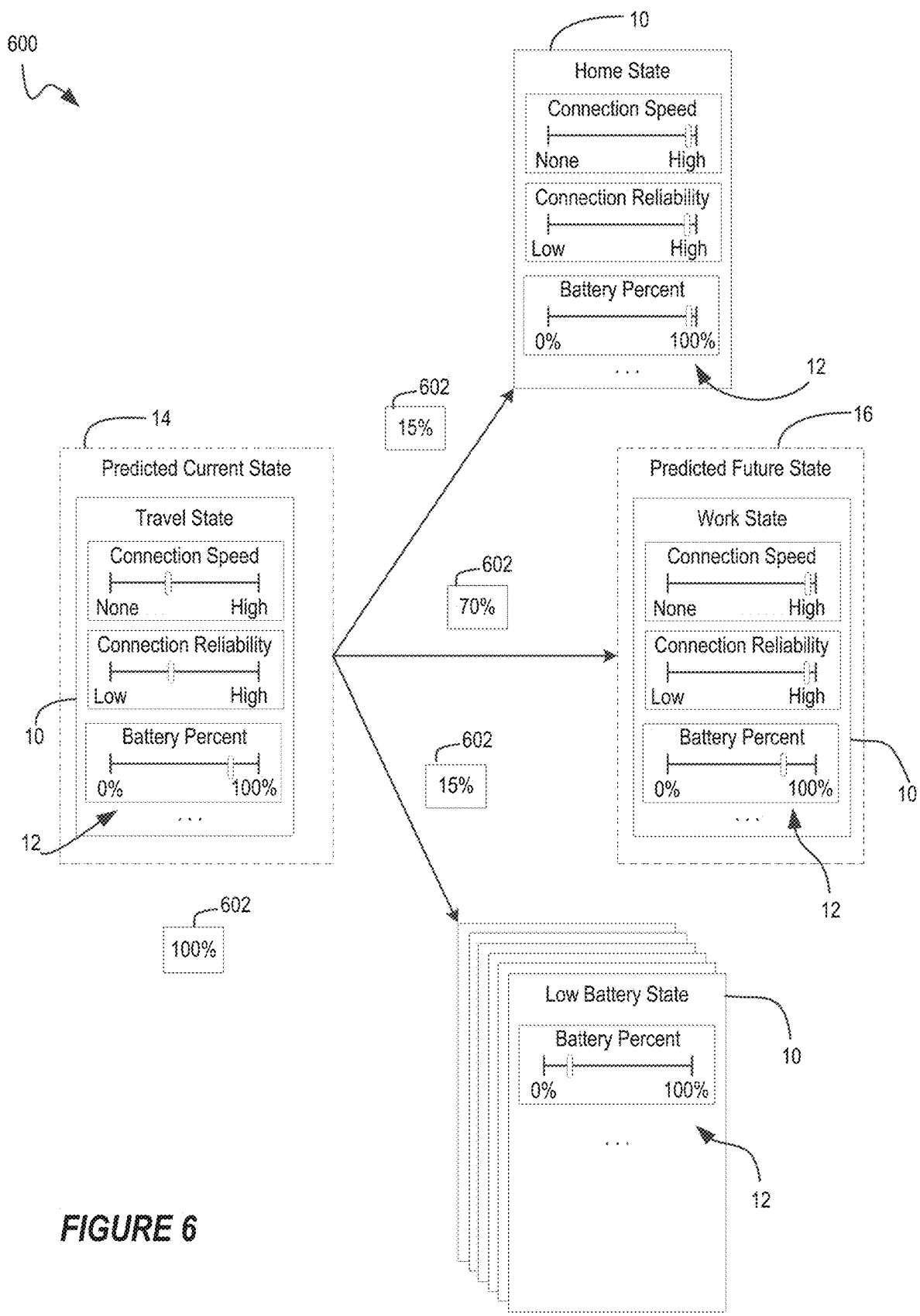
FIG. 6 is a block diagram illustrating an example prediction of FIG. 5.

FIG. 6 is a block diagram illustrating an example of a prediction 600 performed by the prediction engine 107 shown in FIG. 5. As illustrated, there is a single predicted current state 14 leading to a single selected predicted future state 16, as well as multiple potential other future states. For each state 10, the prediction engine 107 can assign a confidence level 602 or probability to each state. In the illustrated example, there is a 100% confidence level 602 that the current state is a travel state, a 15% confidence level 602 that the next, future state will be the home state 10, a 70% confidence level 602 that the next, future state will be a work state 10, and a 15% confidence level 602 that the next state will be a different state, such as a low-battery state. Based on these confidence levels 602, the prediction engine 107 indicated that the predicted current state 14 is a travel state 10 and that the predicted future state 16 is a work state 10.

As illustrated, the predicted current state 14 is a travel state 10. "Travel" and variants thereof refer to any activity in which a user is in transit between two locations. For example, a user is in transit while being conveyed by a vehicle, including motorized and non-motorized public transit and private vehicles. A user is also in transit while moving between locations by other means such as walking and running.

The travel state 10 includes multiple items of metadata 12, including a predicted Internet connection speed, a predicted Internet connection reliability, and a predicted battery level. Other state metadata 12 can include predictions regarding an Internet connection cost, an Internet connection data cap amount, an Internet connection bandwidth, an Internet connection latency, a temperature of the media-playback device 102, an amount of storage free in the media-playback device 102, which media content items the user would be interested in playing, which media content items the user would not be interested in playing, a duration of the state, a location of the state, weather data of the state, any user activity in the state, media content items that other users play during that state, media content items that other users do not play during that state, data from previous times when the user was in that state, a predicted mood of the user while in that state, a predicted energy level of the user while in that state, and other data. There can also be state-specific metadata. For example, a cooking state may include metadata regarding a kind of food being prepared. As another example, a travel state may include metadata regarding a travel destination, traffic along a travel route, a travel transportation type (e.g., public transit, personal vehicle, shared vehicle, etc.), travel transportation make, and a travel transportation model, among others.

Multiple states 10 can exist simultaneously, and states can exist at multiple levels of specificity. For example, the user may be in a travel state 10 but can also have a strong Internet connection, so can be considered as being in a strong connection state. These can be considered as two different, simultaneously current states 14, and can also be considered as a single, specific state (e.g., a traveling-with-a-strong-connection state). When there are multiple simultaneous states, they can all be considered a current state 14 or can be prioritized such that a highest-priority state 10 is considered the current state 14. For example, the states 10 can be prioritized in terms of how much they affect playback or overall user experience. For example, a low-battery state 10 may be considered as a higher priority than a travel state 10 because having a low battery can limit the amount of time that media content can be played, and draining an already low battery can negatively affect a user experience.

FIG. 7 is a block diagram illustrating an example process 700 for predicting a state.

The process 700 can begin with operation 702, which relates to acquiring training examples of user and device metadata for states. In some embodiments, acquiring training examples includes acquiring files containing training examples. In some embodiments, acquiring training examples includes acquiring one or more lists of information that identifies a location of files containing the training examples (e.g., a location in the memory device 156 or the memory device 190). In an example, the training examples include states 10 and input data 502 that have positive or negative correlations with respective states. For example, the training example can include data that shows that a media-playback device traveling at speeds greater than 20 miles per hour (32 kilometers per hour) for longer than 1 minute positively and strongly correlates with a travel state 10. As another example, the training example can include data showing that a user having a calendar entry titled "running" positively correlates with an exercise state at that time. As another example, the training example can include data showing that a user playing a media content item playlist called "cooking" is positively correlated with the user being in a cooking state. As another example, playing a "studying" playlist can positively correlate with a user being in a studying state. The training examples can be based on data gathered from the current user (e.g., based on a set of data, the prediction engine 107 previously predicted a particular predicted future state 16 and that prediction ended up being correct or incorrect). The training examples can be based on data gathered from other users, such as other users sharing one or more demographic similarity with the user (e.g., location, age, music preferences, etc.). Training examples can also be based on data received directly from the user. For example, prediction engine 107 can ask the user questions, such an inquiry regarding the address of the user's workplace. The responses to those questions can be used as training data. For example, travel towards the workplace address can positively correlate with a current state being a travel state, and a predicted future state being a work state. Operation 704 can follow operation 702.

Operation 704 relates to building a model using the training samples. In various embodiments, the model is built using one or more machine learning techniques, such as through the use of neural networks. The model may, for example, operate to determine how similar or dissimilar given input data 502 is to particular training examples for particular states. Once generated, the models may be stored in memory device 156, memory device 190, or in another location, for later use to evaluate media content items. Operation 706 can follow operation 704.

Operation 706 relates to using the model and input data 502 to predict a device state. The input data 702 is run through the model to produce one or more predictions. The one or more predictions can have a respective score expressing a confidence in the prediction being correct, such as a value expressing how similar the input data 702 is to a particular training example. Such confidence can be expressed as, for example, a percent likelihood that the given state is the current state 14 or will be a predicted future state 16.

One or more techniques for building models and training described in WO 2017/214408, titled "Identifying Media Content", can be similarly used by system 100 disclosed herein for building models for predicting device states. Other techniques described in the publication can be used for other purposes.

Figure 8:
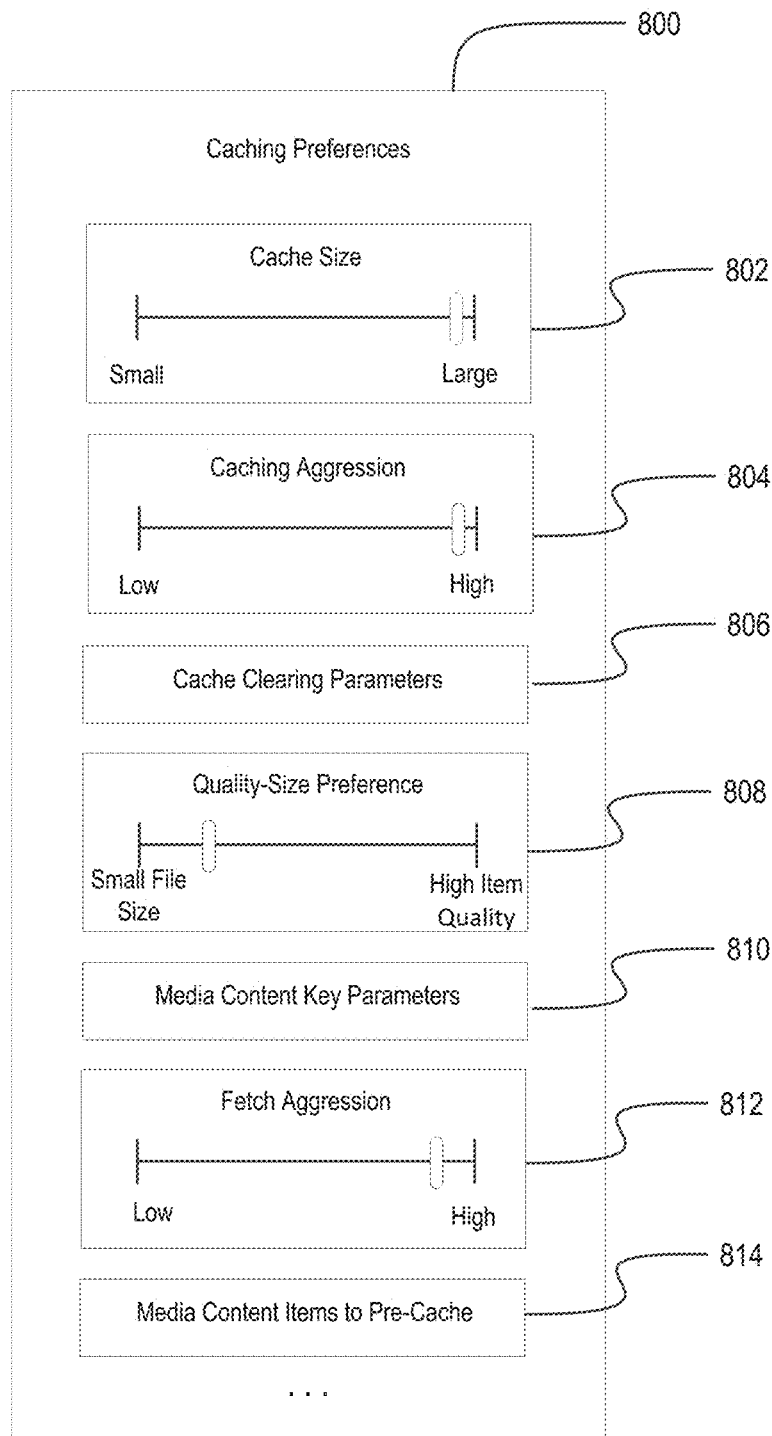
FIG. 8 is a block diagram illustrating example caching preferences.

FIG. 8 is a block diagram illustrating example caching preferences 800. The predicted states 10 can be used to inform modifications to one or more caching parameters. Caching parameters can include, but need not be limited to, a caching aggression 804, cache clearing parameters 806, a quality-size preference 808, media content key parameters 810, a fetch aggression 812, media content items to pre-cache 814.

Cache size 802 reflects a size of the cache. Cache size 802 can include, but need not be limited to a number of media content items that can be stored in the cache at once, a total size of media content items that can be stored in the cache at once, and an amount of memory allocated for the cache.

Caching aggression 804 can reflect a tendency of the caching engine 108 to cache more content items rather than fewer. For example, after the media-playback engine 170 plays a media content item, the caching engine 108 may perform a cache operation and determine whether or not to keep the item in the cache. A more aggressive caching engine would tend to cache more media content items than a less aggressive caching engine.

Cache clearing parameters 806 can affect the circumstances under which a caching engine 108 will remove media content items from the cache. For example, the caching engine 108 can perform a cache operation to remove one or more media content items from the cache to make room for new media content items. The cache operation to remove media content items can occur periodically (e.g., once every hour) and/or can occur responsive to the caching engine 108 attempting to add a new content item to the cache. The caching engine 108 can use a variety of criteria to select media content items for removal, including, but not limited to, how long the media content item has been in the cache, a length of time since the media content item was last played, a number of times the media content item has been played, a size of the media content item, a quality of the media content item, and a prediction of when the user will play the media content item.

The quality-size preference 808 can reflect a preference between higher-quality cached items and smaller-sized cached items. A caching engine 108 having a preference towards higher-quality cached items may cache media in a higher-quality format (e.g., using a lossless codec or using a higher bit rate). Caching items at a higher-quality may result in the cached items having a larger file size compared to caching items at a lower quality.

Lower-quality items may have a smaller file size, which means that the items may be download from media-delivery system 104 for caching more quickly than larger, high-quality items. In some examples, the caching preferences 800 may cause the caching engine 108 to download media content items at a lower quality setting first, and then replace the lower-quality media content items with higher-quality media content items later. This can be beneficial in circumstances where the current or predicted state has limited network connectivity. This can also be beneficial in circumstances where the user may transition to a new state in a relatively short amount of time, and the quicker download speeds can mean that appropriate media content items are cached in time.

Media content key parameters can affect the caching of media content decryption keys. In some examples, the media content items are stored in the media content cache 172 in an encrypted format, and the media content cache 172 can store decryption keys for some or all of the media content items that are stored in an encrypted format. The media content key parameters 810 can affect how the caching engine 108 curates the storage of the media content keys in the cache, including, but not limited to, the length of time that the keys are stored, under what circumstances the keys are removed from the cache, and under what circumstances the keys are added to the cache. In some examples, when a media content item is added to the cache, so is an associated decryption key. After a period of time, the decryption key can be removed from the cache (e.g., for digital rights management purposes). The key can be retrieved (e.g., from the media-delivery system 104) the next time that the media content item is to be played. However, if the device 102 is in a state in which it cannot retrieve the key (e.g., the device is in an offline state), then the user may not be able to play the media content item, even though it is cached, because the key is not available to decrypt the content item. In an example, in anticipation of a limited network connectivity state, the media content key parameters 810 can be updated to include a parameter to cause the caching engine 108 to retrieve all missing media content keys for cached media content items, and a parameter to cause the caching engine to less aggressively delete media content keys.

Fetch aggression 812 can reflect how aggressively the caching engine 108 will cache media content items that it predicts may be played next or within a threshold period of time (e.g., as stored in a songs-to-pre-cache parameter). These media content items can be described as media content items to pre-cache 814. For example, if a user is currently playing the last song of an album, a caching engine with a moderate fetch aggression may cache the first song of the artist's next album. A caching engine with a high fetch aggression may download that song, as well as additional songs that may be played next, such as the first song of albums similar to the original album. An example process for selecting such items is described in FIG. 9.

The caching preferences 800 affect the caching of media content items and can also affect the caching of other data on the device, such as ancillary materials supporting the media content items. For example, for song media content items, there can also be associated lyrics, music videos, album art and other materials that are related to the media content items that can be cached. As another example, video media content items can include extra audio tracks, bonus content (e.g., deleted scenes, director's commentary, etc.) that can be cached. These ancillary materials can be affected by the same caching preferences as the media content items, separate preferences, or combinations thereof. For example, a high caching aggression 804 may cause an aggressive caching of the ancillary materials as well. In another example, the caching engine 108 can learn what ancillary materials the user (e.g., using the same or a similar process as described at FIG. 9) consumes and will aggressively download only those materials. For example, even with high caching aggression, the caching engine 108 may not download director's commentary for a movie if the user does not tend to play director commentaries.

Figure 9:
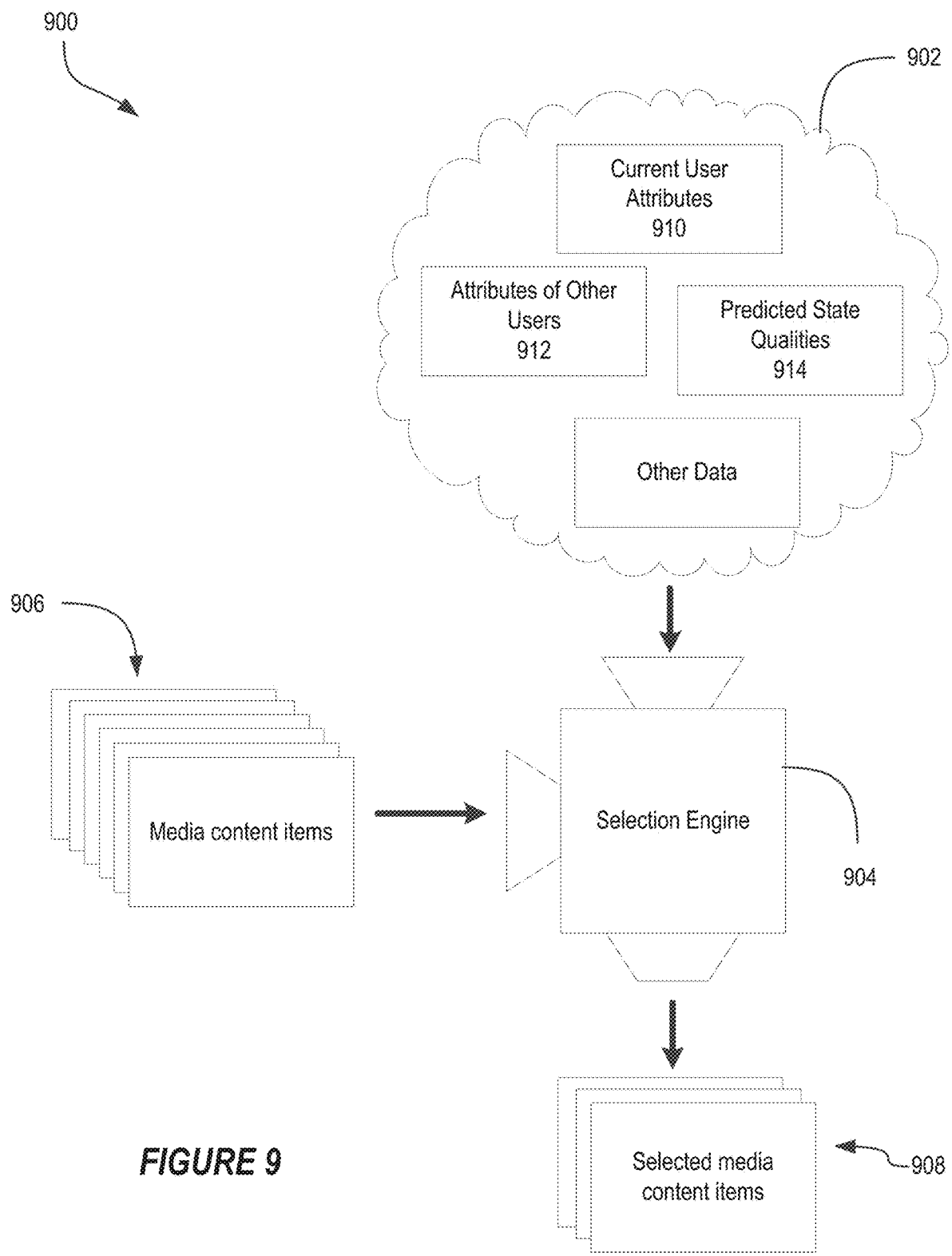
FIG. 9 is a block diagram illustrating an example process of selecting media content items.

FIG. 9 is a block diagram illustrating an example process 900 of selecting media content items, such as media content items to cache. The process 900 may begin with receiving input data 902 that may affect the selection of media content items 906. The input data 902 may be fed into a selection engine 904 that also receives a group of media content items 906 available to be played (e.g., media content items available to the user on the media server 180). Based on the input data 902, the selection engine can output selected media content items 908. The selected media content items 908 can reflect, for example, predicted media content items that the user may want to play in the current state or in the predicted future state.

The selection engine 904 can select media content items in a variety of ways. In an example, the user can specify media content items or kinds of media content items for selection for particular states. For example, the user can specify that he or she prefers to listen to electronic music in an exercise state and classical music in a cooking state. In an example, the selection engine can select top media content items for the user. For example top-rated content items (e.g., as rated by the user or others) or top-played content items (e.g., overall top played content items or top-played content items for particular states). In an example, the selection engine 904 can use data analysis and machine learning techniques to select media content items. In another example, the selection engine 904 can use heuristics and score various media content items based on their suitability based on the input data 902. For example, a media content item being played by the user in the state can increase that media content item's score by x points, while a media content item being skipped by the user while in the state can decrease the media content item's score by y points. The selected media content items 908 can be media content items having a highest score or media content items having a score higher than a threshold.

The input data 902 can include, but need not be limited to: attributes of the current user 910, attributes of other users 912, predicted state qualities 914, and other data (e.g., data used to predict states as described with regard to FIG. 5).

Attributes of the current user 910 can be the qualities, characteristics, and preferences of the user that may affect the selection of media content items for the user. In this manner, attributes of the current user 910 can be used to select media content items that the user may enjoy in a predicted current or future state or in general.

The attributes 910 can include preferences for particular genres (e.g., where the media content items are music, the genres can include rock, country, rap, blues, jazz, classical, etc.), preferences for particular eras (e.g., 60s, 70s, 80s, etc.), preferences for particular media content items (e.g., specific songs, movies, albums, etc.), preferences for particular attributes of media content items (e.g., for songs, the attributes can include: tempo, length, tone, instruments used, key, etc.), and other preferences. The attributes can also include user playback patterns (e.g., in which states the user plays particular kinds of media content items), most-played media content items, media content items marked as favorite media content items, liked media content items, disliked media content items, media playback items that the user selected for download, media content items in the user's library, playlists of the user, and other playback patterns. The attributes 910 can also include demographic information regarding the user, including, but not limited to, the user's age, gender, location, mood, activity level, and other demographic information.

Attributes of other users 912 can include the qualities, characteristics, and preferences of other users. The attributes of other users 912 can be used in the selection of media playback items because the attributes of other users 912 can be used to predict what playback items the current user may like or dislike both for a particular state or in general. For example, the more similarities there are between users, the more likely they may be to prefer the same kinds of media content items. The attributes of other users 912 can include attributes of other users that may be associated with the user while in the particular state. For example, there may be a dropping-the-kids-off-at-school state in which the user can be assumed to be traveling with children. Responsive to this determination, the selection engine 904 can refrain from selecting media content items that are explicit or otherwise unsuitable for children.

Predicted state qualities 914 can include qualities of the current or future states that may affect the kinds of media content items that the user may prefer. The predicted state qualities can include, but need not be limited to, what the state is, duration, activity, mood, location, next state, state-specific qualities, and other attributes. State-specific qualities can vary between states. For example, a state-specific quality for a travel state can include a travel destination, traffic along a travel route, a travel transportation type (e.g., public transit, personal vehicle, shared vehicle, etc.), travel transportation make, and a travel transportation model. The predicted state qualities 914 can also include combinations of states. For example, if the current state is a travel state and the predicted future state is an exercise state, then the user may prefer to listen to upbeat music to get the user in the mood for exercising. As another example, if the previous state is a work state and the current state is a travel state, then the user may prefer to listen to gentler music to relax. The selection engine 904 can select media content items for multiple, predicted future states 16. For example, the user may currently be in a travel state 10, with the likely destination being a work state and with another potential destination being an exercise state. The selection engine 904 can use the predicted state qualities 914 of both the work state and the exercise state when selecting media content items. In an example, the selection engine 904 can select more media content items fitting the work state because it is more likely, and also select some media content items fitting the exercise state because it is another possibility. In another example, the selection engine 904 can select media content items that fit both within the work state and the exercise state to match the possibility of either state.

Figure 10:
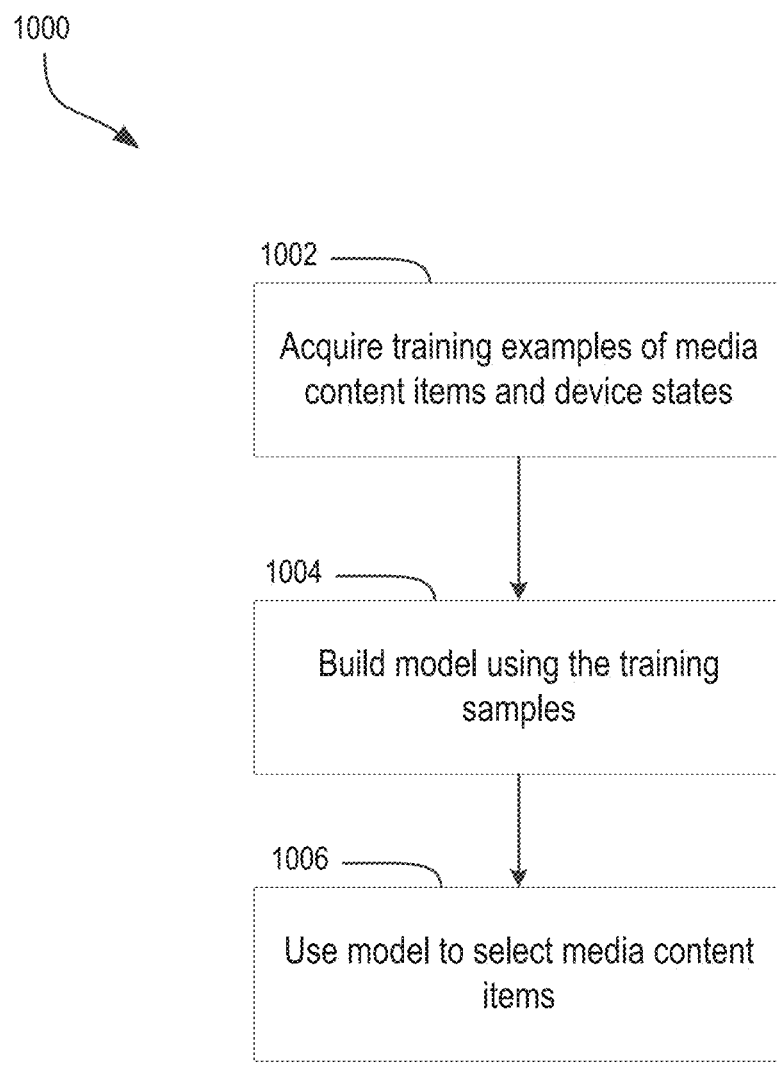
FIG. 10 is a block diagram illustrating an example process of selecting media content items.

FIG. 10 is a block diagram illustrating an example process 1000 of selecting media content items such as for the selection engine 904.

The process 1000 can begin with operation 1002, which relates to acquiring training examples of media content items and device states. In some embodiments, acquiring training examples includes acquiring files containing training examples. In some embodiments, acquiring training examples includes acquiring one or more lists of information that identifies a location of files containing the training examples (e.g., a location in the memory device 156 or the memory device 190). In an example, the training examples include states 10 and input data 902 that have positive or negative correlations with being played in respective states. For example, the training example can include data that indicates that high energy songs more positively correlate with being played in an exercise state. As another example, the training example may include data indicating that Italian opera music may positively correlate with being played in an Italian cooking state. The training examples can be based on data gathered from other users, such as other users sharing one or more demographic similarities with the user (e.g., location, age, music preferences, etc.). Training examples can also be based on data received directly from the user. For example, the selection engine 904 can ask the user questions, such as an inquiry regarding the kinds of music that the user likes to listen to during certain activities. The responses to those questions can be used as training data. For example, the user enjoying listening to pop music while running can positively correlate to the user enjoying listening to pop music while in an exercise state and especially a running state. As another example, the selection engine 904 can use playlist data. For example, if the user has a playlist called "studying," then the music in the playlist can correlate to music that the user would enjoy while in a studying state or other similar states. Operation 1004 can follow operation 1002.

Operation 1004 relates to building a model using the training samples. In various embodiments, the model is built using one or more machine learning techniques. The model may, for example, operate to determine how similar or dissimilar the input data 902 is to particular training examples for particular media content items. Once generated, the models may be stored in memory device 156, memory device 190, or in another location, for later use to evaluate media content items. Operation 1006 can follow operation 1004.

Operation 1006 relates to using the model and input data 902 to select media content items. The input data 902 is run through the model to produce one or more predictions. The one or more predictions can have a respective score expressing a confidence in the prediction being correct, such as a value expressing how similar the input data 902 is to a particular training example. Such confidence can be expressed as, for example, a percentage likelihood that the user will enjoy a particular media content item given the input data 902.

One or more techniques for building models and training, described in WO 2017/214408, can be similarly used by process 1000 for building models and training.

Rendering Media Content Items at a User Interface

How media content items are rendered at a user interface can vary across device states. For example, the media-playback engine 170 can display media content items more prominently that it predicts the user will enjoy in a particular device state. As another example, the media-playback engine 170 can represent media content items in different ways depending on whether and/or how they can be played in a particular state. For example, in certain states (e.g., an offline state), media content items that need to be streamed from the media server 180 may be unavailable to be played.

Figure 11:
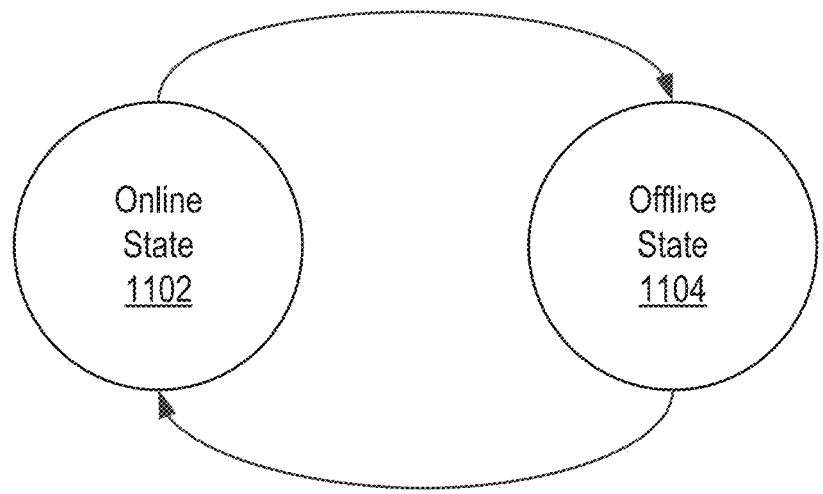
FIG. 11 is a state diagram illustrating an online state and an offline state.

FIG. 11 is a state diagram illustrating an online state 1102 and an offline state 1104. The online state 1102 may generally be any state where the device may access non-locally stored resources for media content item playback (e.g., the media-playback device 102 can stream media content items from the media server 180). The offline state 1104 may generally be any state where the device cannot access non-locally stored resources for media content item playback (e.g., the device 102 lacks Internet connectivity and cannot stream from the media server 180 or the media server is offline for maintenance).

To provide a positive user experience, it can be advantageous to make media content items available to a user across states. For example, when a user enters an offline state 1104, it can be advantageous to show the user all of the media content items that are available for playback, rather than preventing the user from playing any content. In some instances, the user may have selected particular media content items to download for playback even in an offline state 1104. In some instances, there may also be locally-cached content (e.g., because the media content item was recently played or because it was pre-fetched for playback by the caching engine 108) that can be played in the offline state 1104. In some instances, some media content items may be unavailable for playback in the offline state 1104, such as media content items that are streamed from a remote location. The media-playback device 102 can be configured to let the user see and play not only media content items that the user has selected for download, but also media content items that have been cached.

Media content items can be represented in different ways in different states. Consider an example in which there are five media content items: songs 1-5. Songs 1 and 2 are user-selected songs that were downloaded to, and available for local playback from, the user-selected content storage 173. Songs 3 and 4 are not stored locally and must be retrieved from the media server 180 before playback. Song 5 is not a song that the user selected for download, but it is available for local playback from the media content cache 172.

Figure 12:
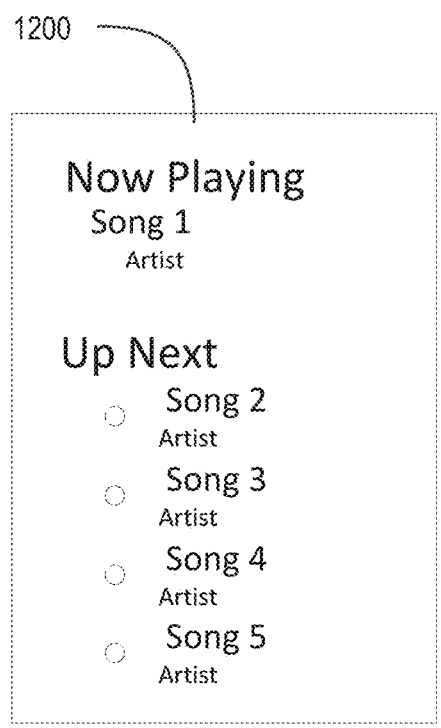
FIG. 12 is a diagram of an example user interface showing media content items with a media-playback device in an online state.

FIG. 12 is a diagram of an example user interface 1200 showing media content items with a media-playback device in the online state 1102. Here, each song 1-5 is available for playback, and each song 1-5 is displayed on the user interface and available for playback.

Figure 13:
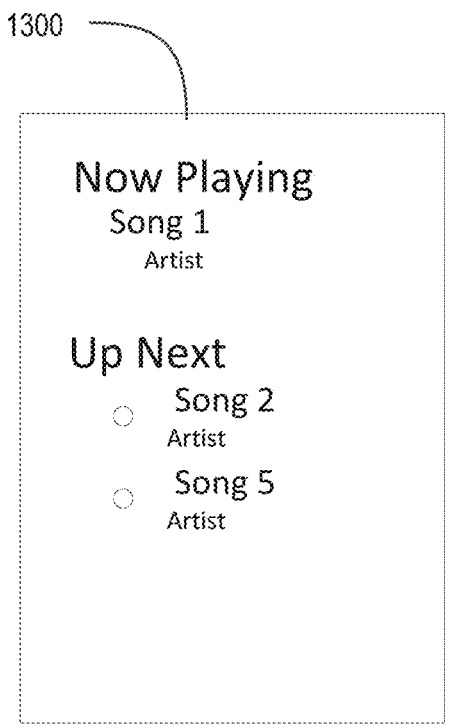
FIG. 13 is a diagram of an example user interface showing media content items with a media-playback device in an offline state.

FIG. 13 is a diagram of an example user interface 1300 showing media content items with a media-playback device in the offline state 1104. Here, only songs 1, 2, and 5 are shown, because those are the only songs available for playback in the current state. The user can select and play those songs.

In an example, the media-playback device 102 can be configured to automatically switch to an offline user interface (e.g., user interface 1300) from an online user interface (e.g., user interface 1200) upon detecting or predicting that the device 102 entered an offline state. In another example, the user interfaces can be changed manually by the user (e.g., through the selection of a toggle).

Figure 14:
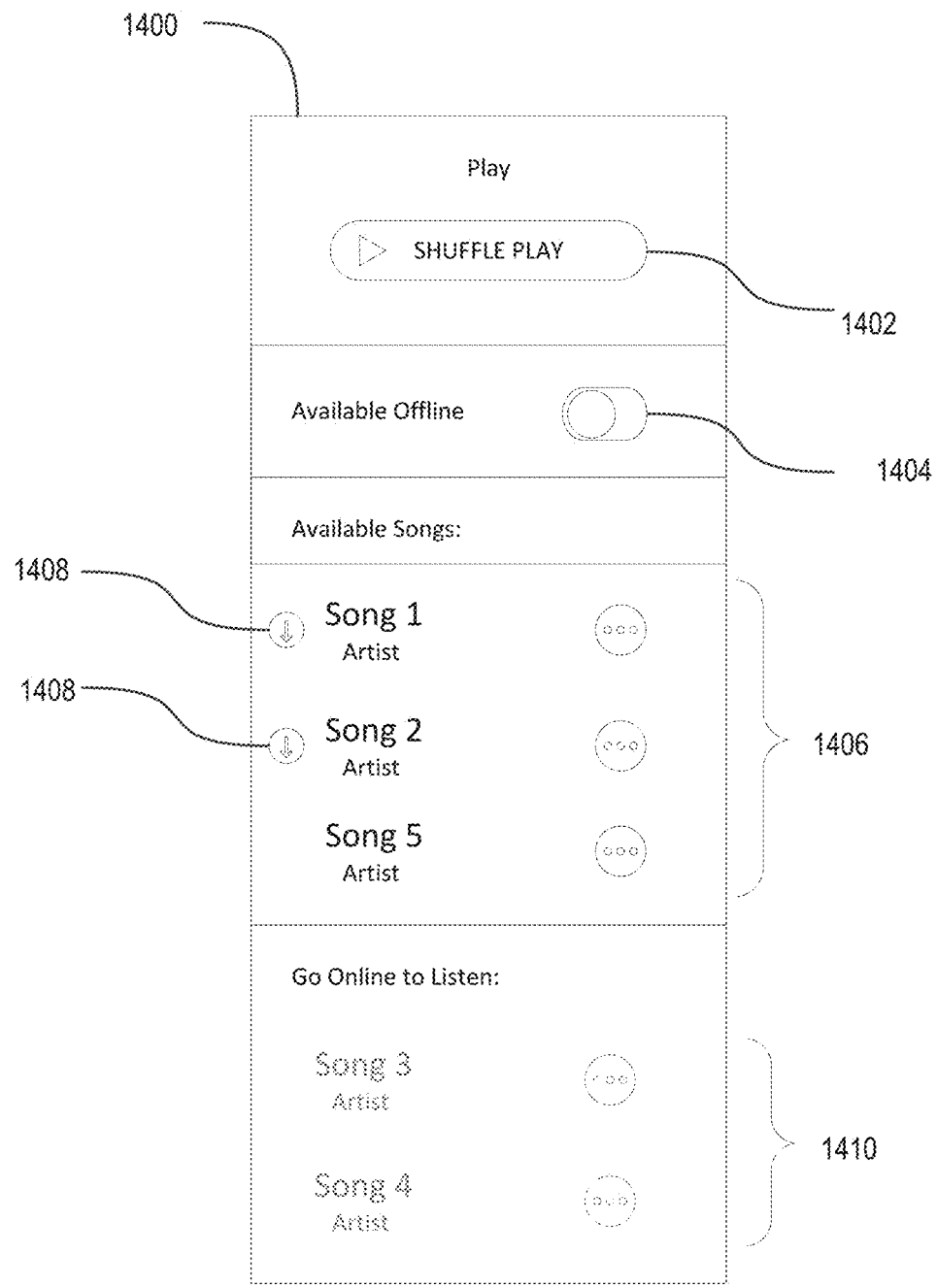
FIG. 14 is a diagram of an example user interface showing media content items with a media-playback device in an offline state.

FIG. 14 is a diagram of an example user interface 1400 showing media content items with a media-playback device in the offline state 1104. Here, the user interface 1400 includes a shuffle play button 1402 for receiving a user request to play songs in a shuffle mode, as well as a display toggle 1404 for toggling the display of only songs that are available offline. The user interface 1400 displays both cached and user-selected songs as being available to play 1406. The user interface 1400 further distinguishes user-selected media content items from cached media content items by marking the user-selected media content items with a flag 1408 indicating that these items were selected by the user (e.g., selected by the user for download and are stored locally on the media-playback device 102 in the user-selected content storage 173). In contrast to the user interface 1300, rather than not showing the songs that are unavailable to play 1410, the user interface 1400 represents them as dimmed or otherwise unavailable for selection. The user interface 1400 also represents the unavailable songs 1410 in a separate section from the available songs 1406.

The user interface 1400 can include one or more changes based on the state of the user or the playback device. For example, if the user playback device is in an offline state, then the user interface 1400 can include one or more changes to distinguish it from an online state. In an example, the text descriptor of the shuffle play button 1402 can change from "shuffle play" to "shuffle play recent" when the to-be-played media content items are cached because they were recently played by the user.

The various kinds of media content items (e.g., cached/user-selected/streaming or playable/unplayable) or device states can be distinguished from one another by modifying the user interface 1400 in a variety of ways, including, but not limited to, the use of: size, color, highlighting, shading, emphasis (e.g., bolding, italics, or underlining), font, indentation, location, grouping, effects, and icons or flags (e.g., a picture indicating "downloaded" may be placed next to a downloaded media content item). In another example, the media content items can be put into particular libraries or playlists. For example, there may be a local playlist that includes cached and user-selected media content items, a cached playlist, a most-played playlist, a most-popular playlist, or other playlists or libraries.

Determining Media Content Items to Cache

Figure 15:
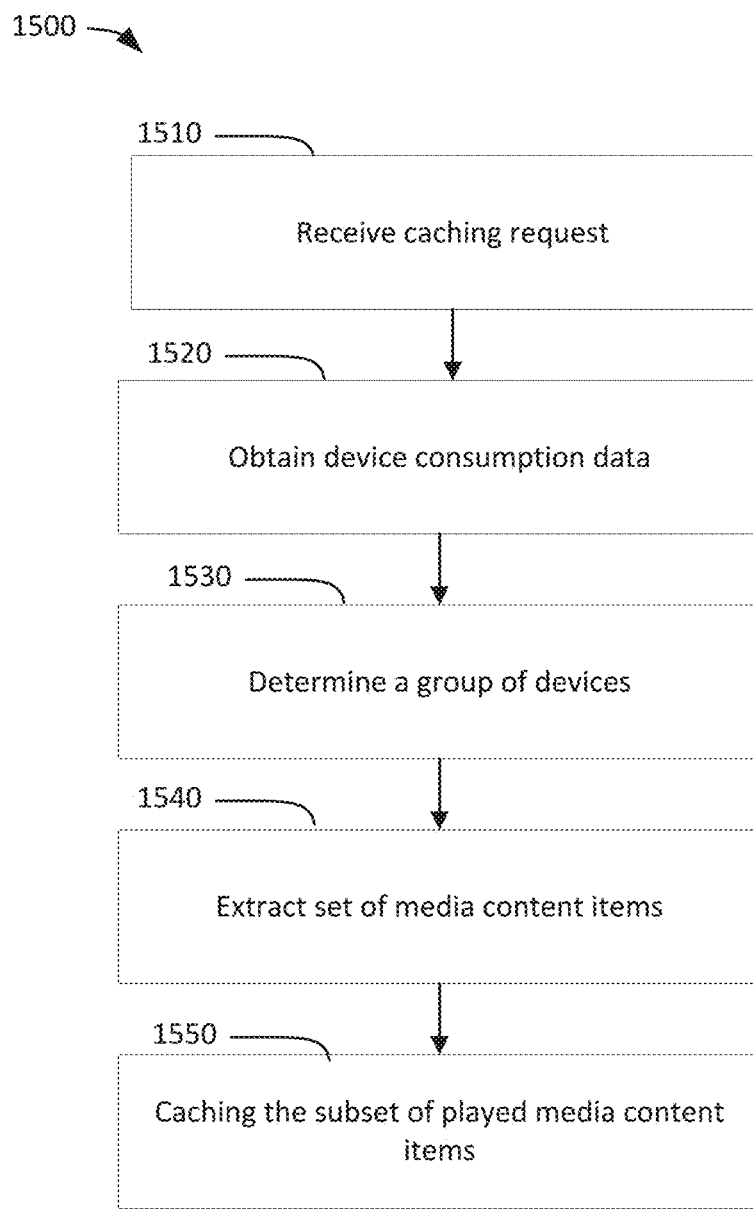
FIG. 15 is a diagram of an example process for determining media content items to cache.

FIG. 15 illustrates an example process 1500 for caching media content items. The process 1500 includes determining items to cache for a given device based on media content items played by devices having similar preferences to the given device. In many examples, this process 1500 is performed by the media-delivery system 104 or another system remote from the media-playback device 102. In other examples, the process 1500 is performed by the media-playback device 102 or by the media-playback device 102 in conjunction with another system.

The process 1500 begins with operation 1510. In the operation 1510, a caching request is received from the media-playback device 102. The media-playback device 102 is associated with a particular account.

In an example, the media-playback device 102 provides the caching request based, in part, on whether a predictive caching flag is set to allow or disallow predictive caching. When the media-playback device 102 determines that the predictive caching flag is set to allow predictive caching, the media-playback device 102 executes predictive caching processes. In an example, the device sets the flag based on a data connectivity method available to the media-playback device 102 (e.g., whether cellular data or WI-FI data is available to the media-playback device 102). In an example, where the media-playback device 102 is a cell phone or laptop, the media-playback device 102 sets the predictive caching flag to allow predictive caching when the media-playback device 102 has particular connections (e.g., the media-playback device 102 is connected to WI-FI or ETHERNET). The media-playback device 102 sets the predictive caching flag to disallow predictive caching when other connections are being used (e.g., a cellular connection) or when particular connections are unavailable (e.g., when WI-FI or ETHERNET connections are unavailable). In another example, the media-playback device 102 is a vehicle-based device (e.g., a vehicle head unit or a smart vehicle media appliance), and the media-playback device 102 sets the predictive caching flag to allowed predictive caching when the media-playback device 102 detects that it is connected to WI-FI or during times when data connectivity costs are low (e.g., cellular data is cheaper at night).

In operation 1520, device-specific media content item consumption data for the media-playback device 102 is obtained. For example, a media content item playback log for media content items played on the device is obtained from a data store. In some examples, the data store is located at the media-playback device 102. In other examples, the data store is located at the media-delivery system 104. The media content item playback log includes a list of identifiers of media content items that were played by the media-playback device 102. In some examples, the media content item playback log also includes timestamps of when the media content items were played. In an example, the media content item playback log is limited to a particular time frame (e.g., media content items played within the previous thirty days). In some examples, the media content item playback log also includes a media content item context within which each of the media content items were played. For instance, where the media content item is a song, the context of the media content item describes the album, artist, and playlist from within which the song was played.

In operation 1530, a group of devices is determined, based on the obtained media content item consumption data. In an example, determining the group of devices includes clustering one or more other devices having similar media content item consumption data into the group of devices. The similarity in media content item consumption data can include similarities in most-played media content items or contexts over a predefined period of time. For instance, devices having similarities in most-played media content items are grouped. In an example, clustering the one-or-more other devices includes clustering devices or accounts based on user experience, behavior, and interactions. Such techniques can be used to perform the clustering, and are described in more detail in U.S. Pat. No. 9,742,871, entitled "Methods and systems for session clustering based on user experience, behavior, and interactions".

In operation 1540, a set of media content items are extracted, based on the group. In an example, the media consumption data for each device in the group is aggregated to form group media content item consumption data. A set of one or more media content items or contexts are selected from the group media content item consumption data. In examples, selecting the set of media content items includes selecting a number of most-played media content items for the group (e.g., selecting the top ten most played media content items for the group). In examples, selecting the set of media content items includes selecting a number of most-played media content item contexts for the group (e.g., selecting the top three most-played albums for the group).

In operation 1550, the set of media content items are cached to the media-playback device 102. In an example, this operation 1550 includes causing the extracted subset of media content items to be cached in a memory region of the media-playback device 102. In some examples, this operation 1550 includes updating a database local to the media-playback device 102 that describes the media content items cached to the media-playback device 102.

In an example, caching the set of media content items includes caching a mix of media content items selected in the process 1500 (e.g., the set of the one-or-more media content items extracted in operation 1540) and media content items selected in a manner different from the process 1500. For instance, the different manner includes selecting media content items based on specific media consumption by the media-playback device 102, such as caching media content items in a currently playing media context (e.g., caching not-yet-played songs in a currently-playing album). In another instance, the different manner includes caching based on specific media consumption by an account associated with the media-playback device 102. In an example, the mix includes a ratio where X % of the cached media content items are selected based on process 1500 (e.g., the set of media content items), and Y % of the cached media content items are selected in a different manner (e.g., based on specific media consumption by the media-playback device 102). In some examples, X is greater than Y. In other examples, Y is greater than or equal to X. In some examples, X is approximately 70 (i.e., X % is approximately 70%) and Y is approximately 30. In an example, the percentage is based on the raw number of media content items. In an example, the percentage is based on playback length of media content items. In an example, the percentage is based on the file size of media content items.

In an example, the caching is based specific play contexts. For instance, a context is the container entity that includes a collection of media content items, such as a playlist, radio, album, artist, and podcasts.

In some examples, the process 1500 can be supplemented through the use of machine learning techniques. For instance, the process 1500 can include training a machine learning framework using preference signals. For example, the preference signals include, or are based on, the device consumption data. Then, after receiving the caching request in operation 1510, predicting, using the trained machine learning framework, one or more predicted media content items representing media content items that are predicted to be played by the devices of the group of devices, and adding the predicted media content items to the subset of media content items. In an example, the machine learning framework is trained to optimize for cache efficiency of the media-playback device 102 (e.g., the fitness function of the machine learning framework is based on cache efficiency). In some examples, cache efficiency is based on the size of the cache memory and a total playback length of the one-or-more predicted media content items or contexts. In some examples, cache efficiency is based on a ratio of cache hits to cache misses.

While the example process 1500 is described with respect to device-specific caching, similar techniques may be applied on a per-account basis rather than a per-device basis. In many examples, it is advantageous to apply the example process 1500 on a device level rather than an account level so as to provide for different playback preferences for different devices. For instance, a same person may prefer to listen to heavy metal music while driving, and classical while eating dinner, so higher caching efficiency is achieved by caching heavy metal music to the vehicle-based personal media streaming appliance and caching classical music to a smart speaker located in the user's kitchen.

Terrain-Based Predictive Caching

Figure 16:
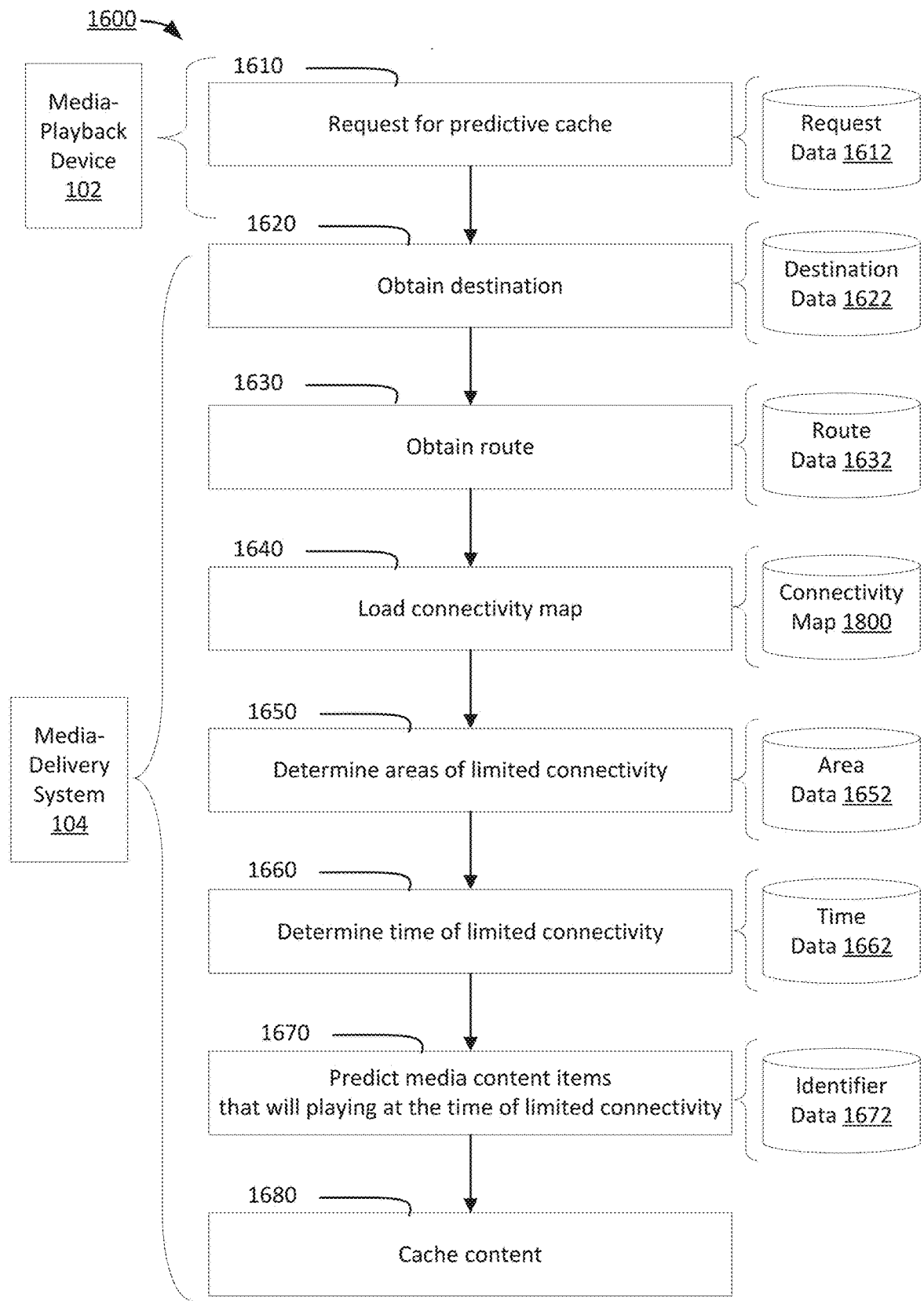
FIG. 16 is a diagram of an example process for media content item caching on the media-playback device

FIG. 16 illustrates an example process 1600 for media content item caching on the media-playback device 102. As illustrated, certain operations of the process 1600 are performed on the media-playback device 102 and other operations of the process are performed by the media-delivery system 104. This is for example only. One or more of the operations are performable on the media-playback device 102. One or more of the operations are performable on the media delivery system 104. One or more of the operations are performable elsewhere.

At operation 1610, the media-playback device 102 requests predictive caching data from the media-delivery system 104. In an example, the media-playback device 102 requests the predictive caching data by making an Application Programming Interface (API) call from an API provided by the media-delivery system 104. The API call specifies one or more parameters. The parameters can include data regarding one or more of: account identifier (e.g., the identifier of the account with which the devices is operating), the current date, the current time, and currently-playing media content item context, among others. The data provided with the request is referred to as request data 1612, and can include parameters provided with the API call or otherwise provided with the request. The request data 1612 can include a variety of data including but not limited to one or more of: a current location of the media-playback device 102 (e.g., specified as latitude and longitude coordinates, an address, plus-codes, or other geocoding systems), a destination for the media-playback device 102 (e.g., a known or predicted destination), and other data. In some examples the media-playback device 102 periodically performs the operation 1610. In some examples, the media-playback device 102 performs the operation 1610 in response to an event, such as receiving user input requesting predictive caching or determining that the media-playback device 102 is traveling. The media-delivery system 104 receives the request data 1612.

At operation 1620, the media-delivery system 104 obtains destination data 1622 that specifies a destination of the media-playback device 102. In an example, the media delivery system 104 obtains the destination data 1622 responsive to receiving the request from the media-playback device 102 in the operation 1610. In some examples, obtaining the destination data 1622 includes predicting a destination (e.g., a predicted destination or obtaining a known destination) and storing the destination in a data store as the destination data 1622.

In some examples, obtaining a known destination includes obtaining a destination from a mapping application. For example, where the media-playback device 102 is executing a mapping application that is navigating to a specified destination, the specified destination can be obtained. In an example, the destination is obtained from the mapping application by using an API of the mapping application. In some examples, obtaining the known destination includes obtaining the destination directly from the user, such as by receiving user input that directly specifies the destination, or by the media-playback device 102 providing a predicted destination to the user and asking for whether the predicted destination is correct. In some examples, the media-delivery system 104 obtains the known destination from the request data 1612. For instance, the request data 1612 specifies a known destination or a predicted destination. In some examples, the media-delivery system 104 sends a request for destination data to the media-playback device 102 and receives the known destination as a response.

In an example, predicting the destination includes inferring the destination based on current data regarding the media-playback device 102 (e.g., as may be specified in the request data 1612, such as the current location of the media-playback device 102). In another example, predicting the destination includes inferring the destination based on data regarding past behavior of the media-playback device 102, other devices, or a user of the media-playback device 102. For instance, predicting the destination includes inferring the destination based on historic travel by the media-playback device 102 on a same day of the week and a same hour of the day. An example process for predicting a location that may be used in the operation 1620 is described in relation to FIGS. 19-22. Other example techniques for predicting a destination are described elsewhere herein in relation to predicting a future state. Such techniques can be used in operation 1620.

In some examples, obtaining a known destination is attempted prior to predicting the destination. For instance, obtaining the destination of the media-playback device can include, prior to providing the input data as input to the destination prediction engine: determining whether a known destination is available from a mapping application operating on the media-playback device 102; and determining that the known destination is not available from the mapping application. After determining that the known destination is not available from the mapping application, the destination is predicted using one or more of the techniques described herein.

In some examples, a location (e.g., a current location or a destination) is projected onto a nearest road when the locations is not located on a road (e.g., when the locations are within a building or are in other areas not directly on a thoroughfare). In such instances, the process 1600 can include projecting coordinates to a nearest road. The projecting can include determining a nearest road from a database mapping data. The projection results in a new location (e.g., a new longitude/latitude coordinate) that is on the road.

At operation 1630, route data 1632 is determined using the destination data 1622. In some examples, the route data 1632 is also determined using the request data 1612. In an example, operation 1630 includes obtaining route data 1632 that specifies a route from a current location of the media-playback device 102 to the predicted or known destination of the media-playback device 102 as described in the destination data 1622. In an example, the route data 1632 is stored in a data store and describes a route between a current location of the media-playback device 102 (e.g., as provided as part of the request data 1612 or predicted) and the destination specified by the destination data 1622. In some examples, the route data 1632 includes coordinates, nodes, addresses, directions, or other data describing a route between a first location (e.g., the current location of the media-playback device 102) and a second location (e.g., the destination of the media-playback device 102). In an example, the route data is obtained based on route data stored in a data store (e.g., a database storing road-network data). In another example, the route data 1632 is obtained by receiving a result from an API call of a routing service. For instance, media-delivery system 104 provides the current location of the media-playback device 102 and the destination data 1622 as parameters to an API call of a routing service, such as a routing service of OPENSTREETMAPS provided by the OPENSTREETMAPS FOUNDATION. The output of the API call describes the route, which can be stored in a data store as the route data 1632. In other examples, the route data 1632 is approximated using a straight line between the current location and the destination without regard to roads or other thoroughfares. In other examples, the route data 1632 is described by a series of predicted locations of the media-playback device 102. For example, the media-delivery system 104 can iteratively predict the location of the media-playback device 102 farther and farther into the future, and use the resulting predicted locations as describing a route.

At operation 1640, a connectivity map 1800 is obtained. The connectivity map 1800 is a data structure storing connectivity data for a particular region in a usable form. In some examples, the connectivity map 1800 is obtained based on the route data 1632, the request data 1612, or both the route data 1632 and the request data 1612. For example, the media delivery system 104 maintains a connectivity map data store having multiple connectivity maps organized in association with particular days of the week, times of day, locations, and connectivity providers, among other data. The connectivity map 1800 is selected from the connectivity map data store using one or more parameters specified in the request data 1612, the destination data 1622, or the route data 1632. In an example, obtaining the connectivity map

1800 includes selecting the connectivity map 1800 from a plurality of connectivity maps, based in part on a time of day and a day of the week. In some examples, multiple connectivity maps 1800 are obtained, such as two or more connectivity maps describing connectivity between a current location of the media-playback device 102 and a destination of the media-playback device 102. Additional details regarding the creation of the connectivity map 1800 are provided in FIG. 17, and an example of the connectivity map is provided in FIG. 18.

At operation 1650, area data 1652 that specifies one or more areas of limited network connectivity is determined, based on the one-or-more connectivity maps 1800. In some examples, the area data 1652 is further determined based on the route data 1632. Details regarding the areas of limited network connectivity are described as area data 1652. In some examples, the area data 1652 is generated by determining whether the route specified in the route data 1632 passes through one or more sub-regions of the connectivity map 1800 having limited network connectivity. In an example, this includes plotting nodes through which the route passes in the connectivity map 1800, and determining whether any nodes are in areas having limited network connectivity.

At operation 1660, the amount of time that the media-playback device 102 will be in the areas of limited network connectivity is estimated based on the area data 1652 and the route data 1632. In some examples, the route data 1632 describes an amount of time needed to travel the route, and the estimation can be based on this data. In other examples, the amount of time it will take the media-playback device 102 to reach the area of limited network connectivity is determined using an API call of a routing service. In some examples, the output is time data 1662, which includes a data structure storing a start time of a period of limited network connectivity and an end time of the period of limited network connectivity.

At operation 1670, the media-delivery system 104 predicts the media content items that will be played during the periods specified in the time data 1662. The output of the operation 1670 is identifier data 1672 that stores a set (e.g., list) of identifiers (e.g., URIs) of media content items predicted to be at least partially played during a period of limited network connectivity. In an example, a currently-playing context (e.g., album or playlist) is determined. The currently-playing context is used to predict what media content items will be played if playback of the currently-playing context continues. In an example, the operation 1670 includes generating, based on the area data 1652, the identifier data 1672 that identifies one or more media content items to be played during the one or more areas of limited network connectivity. In an example, the time data 1662 is used to determine the identifier data 1672 of the one or more media content items to cache. For instance, a current position in a currently-playing media content item context of the media-playback device 102 is determined. Then, a future position in the currently-playing media content item context that will be playing between the start time of the period of limited network connectivity and the end time of the period of limited network connectivity is determined. Then, a media content item that is scheduled to be played at the future position in the currently-playing media content item context is cached. In an example, predicting the one-or-more media content items to be played during the one-or-more areas of limited network connectivity includes obtaining the time data 1662 that includes a start time of a period of limited network connectivity and an end time of the period of limited network connectivity.

In an example, one or more operations described in relation to FIG. 15 are used to predict the media content items that will be played. In an example, predicting the one-or-more media content items to be played during the one-or-more areas of limited network connectivity includes: obtaining device-specific media content item consumption data for the media-playback device 102; determining a group of devices based on the media content item consumption data; and extracting the one-or-more media content items based on the group, thereby predicting the one-or-more media content items to be played during the one-or-more areas of limited network connectivity. In some examples, extracting the one-or-more media content items based on the group includes selecting a number of most-played media content items for the group. In some examples, determining the group of devices includes, based on the media content item consumption data, determining a similarity in media content item context consumption among the devices over a predefined period of time.

At operation 1680, the identifier data 1672 is used to cache the content predicted to be played during the period of limited network connectivity. In some examples, the media-delivery system 104 iterates through the media content items specified in the identifier data 1672 and pushes the media content items to the media content cache 172 of the media-playback device 102. In some examples, the media-delivery system provides the identifier data 1672 to the media-playback device 102. The caching engine 108 of the media-playback device 102 uses the identifier data 1672, and caches the media content items specified in the identifier data 1672.

Later, when the media-playback device 102 is in the area of limited network connectivity, the media-playback device 102 can play the media content items stored in the media content cache 172, thereby improving the ability of the media-playback device 102 to play media content.

The process 1600 is relevant to predicting an amount of data to be cached on the media-playback device 102 to ensure an uninterrupted listening experience, even when the device is located in an area of limited network connectivity. In this manner, media playback continues when it otherwise might be interrupted or stopped until the media-playback device 102 establishes data connectivity to the media-delivery system 104.

Figure 17:
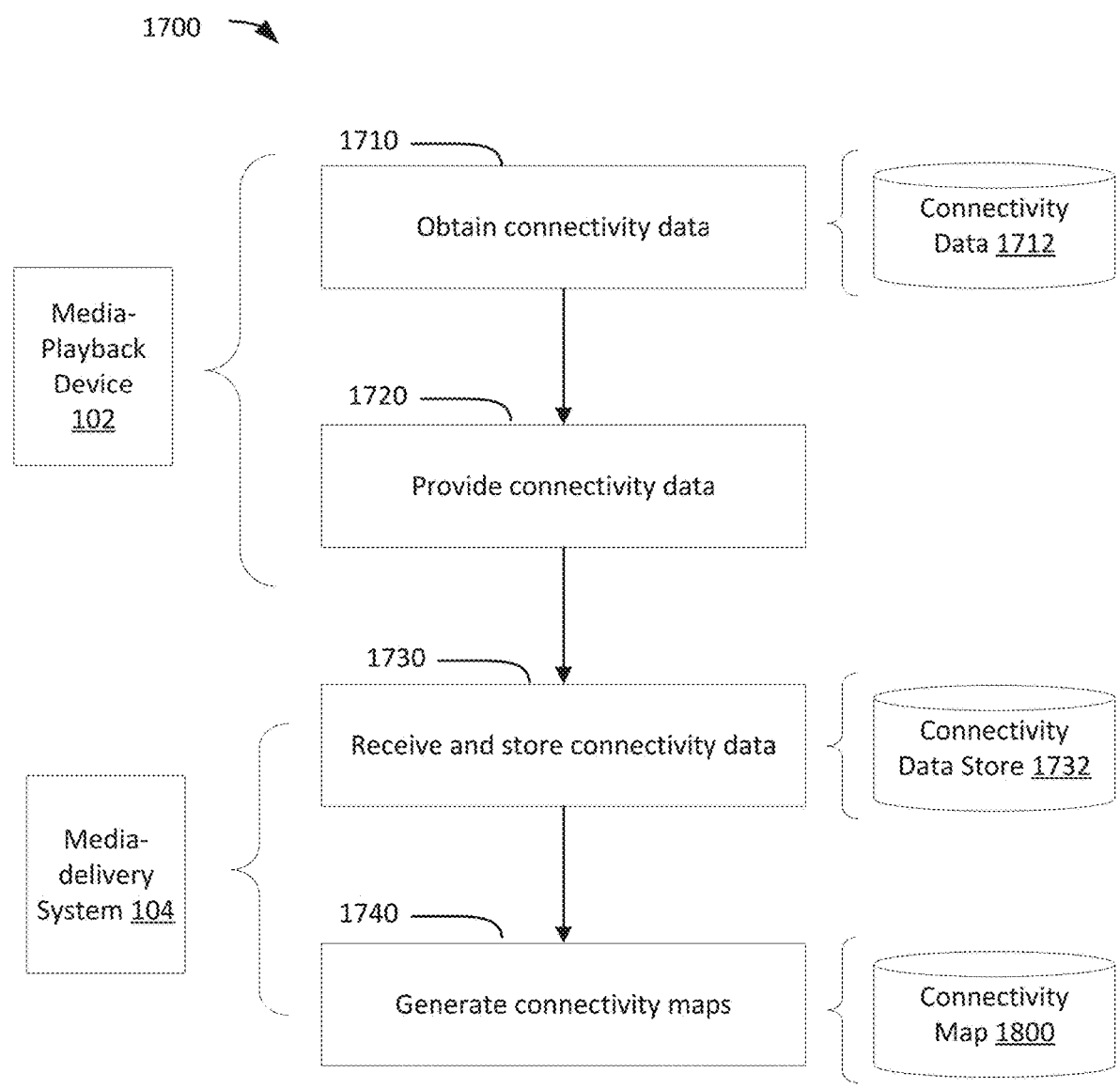
FIG. 17 is a diagram of an example process for generating connectivity maps.

FIG. 17 illustrates an example process 1700 for generating one or more connectivity maps, such as the connectivity map 1800. The process 1700 begins with operation 1710, which includes the media playback device 102 obtaining connectivity data 1712. In an example, the connectivity data 1712 is stored in a data store. The connectivity data 1712 includes data relevant to device connectivity. In an example, the connectivity data 1712 includes, but need not be limited to, data regarding: device location, time of day, day of week, signal strength, network download speed, network upload speed, network hardware (e.g., a cell tower to which a smartphone is connected), traceroute path, network technology (e.g., EDGE, 3G, 4G, LTE, WI-FI, etc.), network ping, and network provider (e.g., name of company providing telecommunications services), among other data. In an example, the connectivity data 1712 is collected periodically (e.g., every second, every minute, every hour, or every mile).

At operation 1720, the media-playback device 102 provides the connectivity data 1712 to the media-delivery system 104 for processing. In some examples the connectivity data 1712 is provided close in time to when it is collected. For instance, the connectivity data 1712 is provided with substantially no delay after it is collected. In other examples, the connectivity data 1712 is provided in batches to the media delivery system 104. For instance, the connectivity data 1712 is collected hourly, and sent to the media-delivery system 104 in daily batches of connectivity data 1712.

At operation 1730, the media-delivery system 104 receives and stores the connectivity data 1712. In an example, the connectivity data 1712 is stored in a connectivity data store 1732. In an example, the connectivity data 1712 is stored in a database of the connectivity data store 1732.

At operation 1740, the media-delivery system 104 processes the information stored in the connectivity data store 1732 to form one or more connectivity maps 1800. Each connectivity map 1800 is a data structure storing aggregated connectivity data for a particular region in a usable form. Connectivity data for a particular location can vary, depending on a variety of factors, such as time of day (e.g., connectivity may be limited during rush hour or during typical working hours due to an increase in a number of devices using network resources), day of week (e.g., weekday vs. weekend), network provider (e.g., one cellular data provider may provide higher speed than another for a same area), and location. Forming the connectivity map 1800 can include organizing data stored in the connectivity data store 1732 according to two or more of the various connectivity factors. In an example, an average is taken of all connectivity quality data (e.g., signal strength, connectivity speed, and/or connectivity latency) for a particular region, at a particular time of day, at a particular day of the week, for a particular provider. For instance, forming the connectivity map 1800 includes taking an average of all signal strength measurements for a particular region, at a particular time of day, at a particular day of the week, for a particular provider. The connectivity map 1800 stores the average in association with the particular region, the particular time of day, the particular day of the week, and the particular provider. In another instance, forming the connectivity map 1800 includes calculating a connectivity quality score based on one or more of signal strength (e.g., a value measured in decibels per milliwatt), connectivity speed (e.g., a value measured in megabits per second), and connectivity latency (e.g., a value measured in milliseconds). The region of the connectivity map 1800 is the particular area for which the connectivity map 1800 stores data. The region can be broken into sub-regions for which data is aggregated in the connectivity data 1712. For instance, the connectivity map 1800 can cover a twenty-five square mile region that is broken into twenty-five sub-regions, each sub-region having a size of one square mile. The sub-regions are the smallest unit of location in the connectivity map 1800. For instance, wherever a device is located within the sub-region (e.g., within the one-square mile of the sub-region), the location of the device is the sub-region, and not a smaller unit (e.g., a precise GPS coordinate or address). Similarly, any connectivity data 1712 obtained from the device would be attributed to the sub-region rather than the smaller unit.

Figure 18:
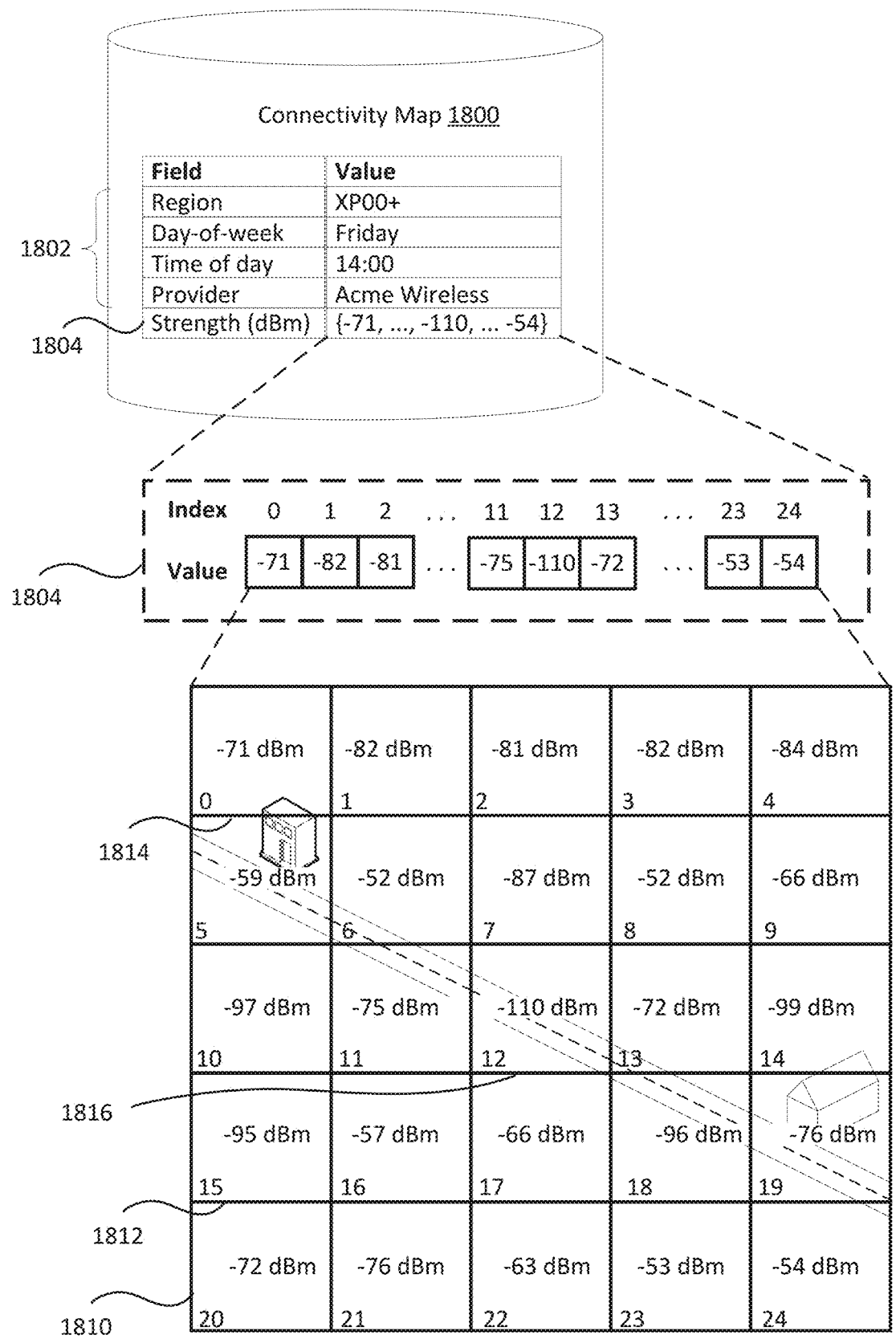
FIG. 18 illustrates an example implementation of the connectivity map.

FIG. 18 illustrates an example implementation of the connectivity map 1800. The connectivity map 1800 includes connectivity map metadata 1802 and the connectivity map data 1804. The connectivity map metadata 1802 includes data describing the connectivity map 1800. The connectivity map metadata 1802 is usable to find a particular connectivity map 1800 from a data store of connectivity maps 1800. In the illustrated example, the connectivity map metadata 1802 includes a region field (e.g., for describing the region that the connectivity map data 1804 covers), a day-of-week field (e.g., for storing a day of the week to which the connectivity map data 1804 corresponds), a time-of-day field (e.g., for storing a time of day to which the connectivity map data 1804 corresponds), and a provider field (e.g., for storing an identifier of the network service provider to which the connectivity map data 1804 corresponds). The time-of-day field can refer to time of day at various levels of granularity, such as nearest hour, minute, or second. In the illustrated example, the time of day field is rounded to the nearest hour.

The connectivity map data 1804 describes the connectivity quality for the various sub-regions in the connectivity map. Connectivity quality is usable to determine areas of limited network connectivity. In the illustrated example, the connectivity map data 1804 is signal strength data measured in decibels per milliwatt (dBm). In other examples, other measures can be used, such as connectivity speed, connectivity latency, and connectivity cost, among others. The connectivity map data 1804 is shown as an array storing connectivity quality values corresponding to the sub-regions. In other examples the connectivity map data 1804 is stored in other forms.

FIG. 18 further illustrates the connectivity map data superimposed over an entire region 1810. As illustrated, the region 1810 is subdivided into twenty-five sub-regions 1812, though more or fewer sub-regions can be used. As illustrated, the sub-regions 1812 take the form of equally-sized squares. In some examples, the sub-regions 1812 have differing sizes. In some examples, the sub-regions have differing shapes. In the illustrated example, a sub-region 1814 corresponds to the index "0" in the connectivity map data 1804, and has a value of −71 dBm, indicating moderate connectivity in the sub-region 1814. A sub-region 1816 corresponds to the index "12" in the connectivity map data 1804 and has a value of −110 dBm, which indicates limited network connectivity in the sub-region 1816 because the signal strength in the sub-region 1816 is low. The connectivity map 1800 is usable to predict whether the media-playback device 102 will enter an area of limited network connectivity. For instance, where the route data 1632 indicates that the media-playback device 102 will pass through the sub-regions 1814 and 1816, the network connectivity quality in those regions is determined using the connectivity map data 1804. For instance, the quality in a sub-region is located using the index of the sub-region and comparing it to a quality threshold. If the threshold is not satisfied, the sub-region is determined to have limited network connectivity, and that caching should be used to ensure proper playback in the sub-region. If the threshold is satisfied, the sub-region is determined to have sufficient network connectivity, such that caching is not necessary. Caching may nonetheless be used.

Destination Prediction

Figure 19:
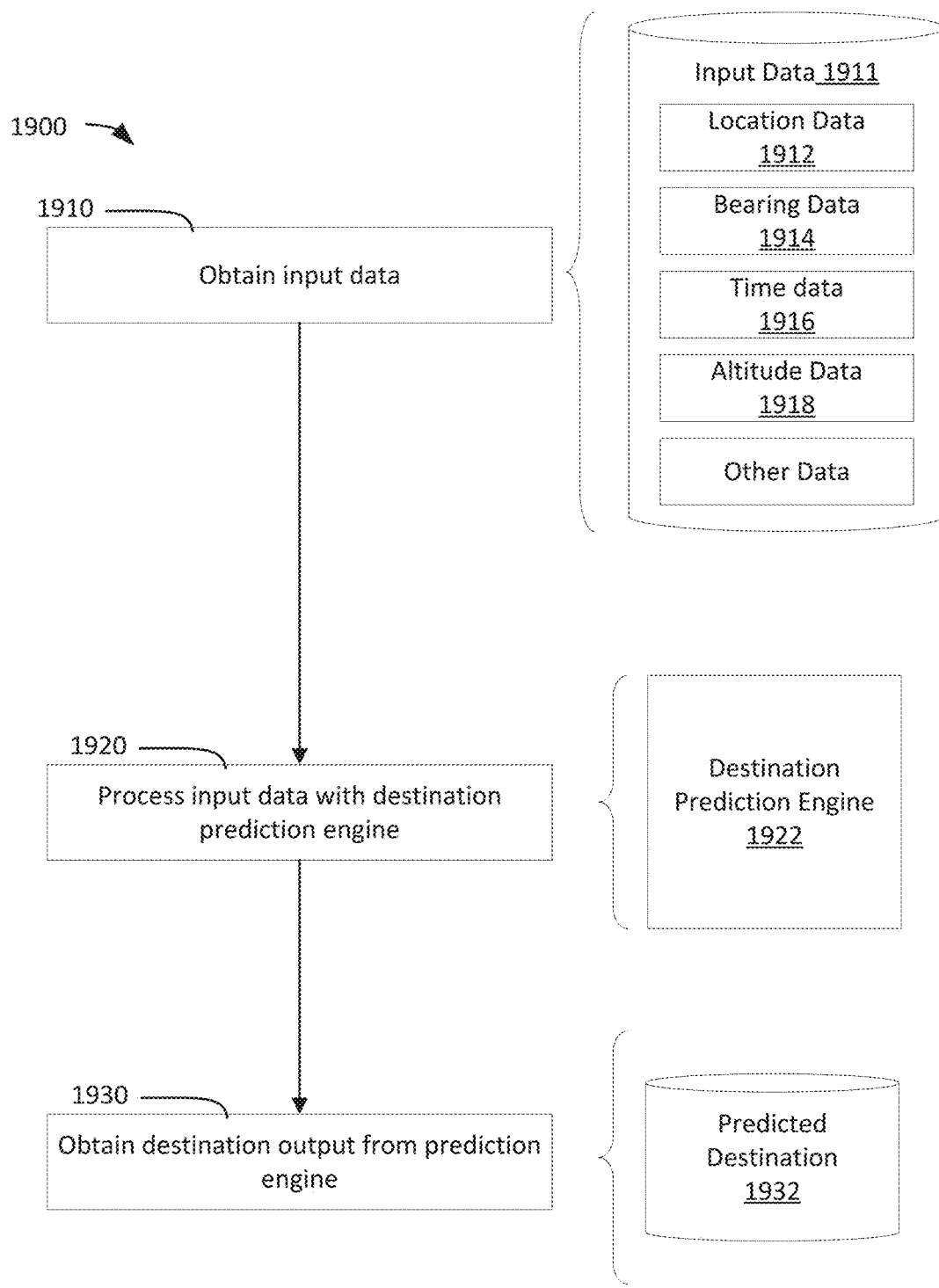
FIG. 19 illustrates an example process for using input data and a destination prediction engine to obtain a predicted destination.

FIG. 19 illustrates an example process 1900 for using input data 1911 and a destination prediction engine 1922 to obtain a predicted destination 1932. In many examples, the process 1900 is performed by the media-delivery system 104 or another system remote from the media-playback device 102. In some examples, the process 1900 is performed by the media-playback device 102.

At operation 1910 the input data 1911 is obtained from the media-playback device 102. The input data 1911 includes data regarding the media-playback device 102 that is usable by the destination prediction engine 1922 to produce a predicted destination 1932. In the illustrated example, the input data 1911 includes location data 1912, bearing data 1914 (e.g., a current bearing of the media-playback device 102), time data 1916 (e.g., the current time of day or day of week), and altitude data 1918 (e.g., a height above sea level), among other data. In an example, more data is used. In an example, less data is used.

The location data 1912 includes data describing a location of the media-playback device 102. In an example, the location data 1912 includes one or more of GPS-location data (e.g., latitude and longitude), an address, a block, a plus code, or expressed in another geocoding system. Example location data 1912 is shown and described in relation to FIG. 20 and FIG. 21.

Figure 20:
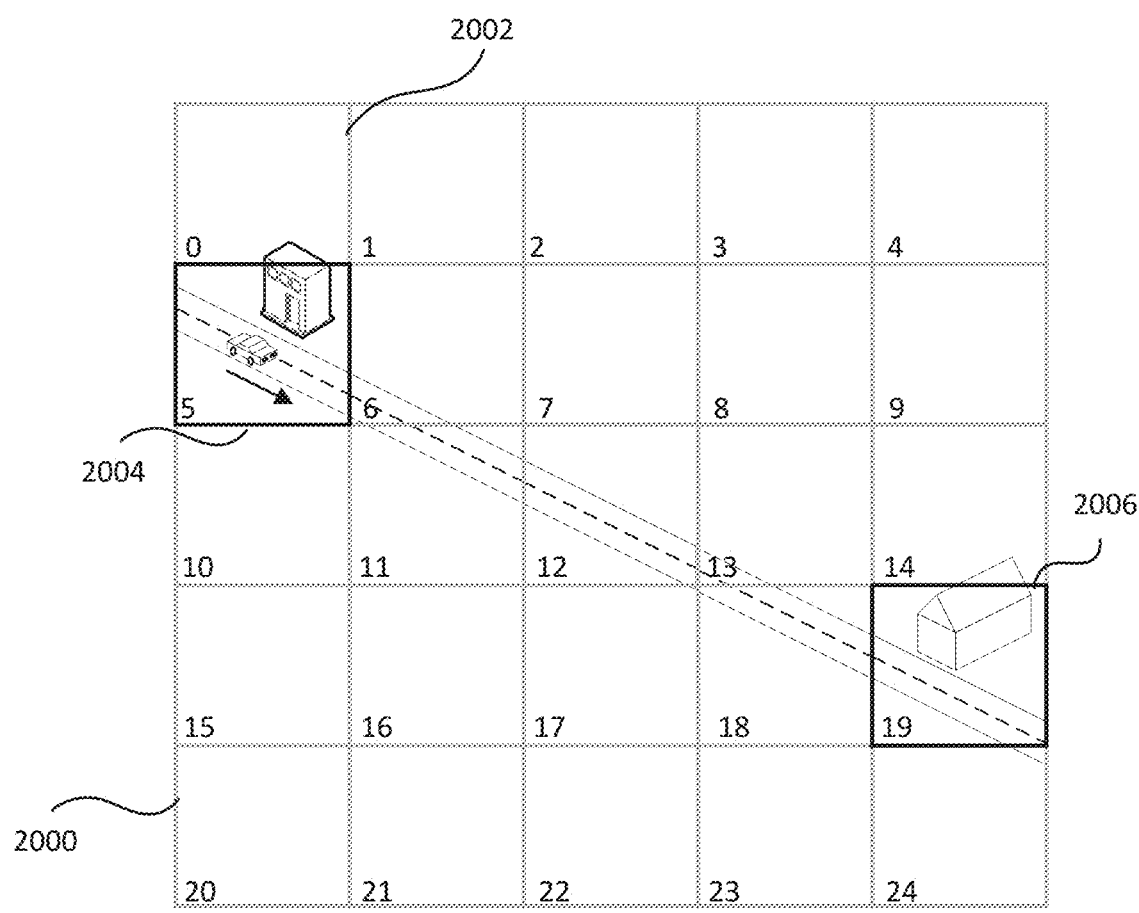
FIG. 20 illustrates an example region having sub-regions.

FIG. 20 illustrates an example region 2000 having sub-regions 2002. The region 2000 can have one or more similarities with or differences from the region 1810 of FIG. 18. The sub-regions 2002 can have one or more similarities with or differences from the sub-regions 1812 described in relation to FIG. 18. The sub-regions are assigned an identifier (e.g., a number). In the example, a current location sub-region 2004 is the sub-region assigned the number "5" as an identifier (e.g., an identifier of an index of a data structure), and a predicted destination location sub-region 2006 (e.g., predicted using the process 1900) is the sub-region assigned the number "19" as an identifier (e.g., an identifier of an index of a data structure).

FIG. 21 illustrates an example form of the location data 1912. Here, the location data 1912 is encoded in a vector, in particular a one-hot vector, where the value of the index corresponding to the sub-region has a value of "1" and all other indexes have a value of "0". This encoding enables processing of the location data by the destination prediction engine 1922. As illustrated, the index "5" has a value of "1", which indicates that the location data 1912 identifies the sub-region 2004.

Returning to FIG. 19, the input data 1911 is provided as input to the destination prediction engine 1922. In an example, the operation 1910 further includes determining, based on the input data 1911, a sub-region in which the media-playback device 102 is located. In addition, an identifier of the sub-region is provided as the input to the destination prediction engine 1922. In a further example, providing the identifier of the sub-region as the input to the destination prediction engine 1922 includes: formatting sub-region data (e.g., as a one-hot vector); and providing the sub-region data (e.g., the one-hot vector) as the input to the destination prediction engine 1922. In an example, providing the input data 1911 as input to the destination prediction engine 1922 includes providing location data, bearing data, and altitude data of the media-playback device 102 as the input to the long short-term memory recurrent neural network.

At operation 1920, the destination prediction engine 1922 processes the input data 1911 to determine a predicted destination 1932. The destination prediction engine 1922 can take any of a variety of forms, and can include a machine learning model trained or otherwise arranged to process the input data 1911 and provide the predicted destination 1932 as output. The machine learning model can include one or more of: a neural network, a deep learning model, or a regression framework. The machine learning model can be trained in any of a variety of ways, including one or more manners similar those described in relation to FIG. 7 (e.g., operation 702 and operation 704 of FIG. 7).

In an example, the prediction engine 1922 includes a multi-layered Long Short-Term Memory (LSTM) recurrent neural network (RNN), which is a neural network having one or more LSTM cells (e.g., within one or more layers of the neural network). In an example, the LSTM cells learn time-series using separate weight matrices and gates (e.g., activation functions) to determine what information to use at a current time step, to determine what information to forget from a previous time step, and to determine what output is provided to a next time step. By using LSTM cells, an LSTM RNN has improved training for non-linear patterns.

The LSTM RNN is trained on training data to predict a destination as output. The training data can be training data for a specific user, for a specific device, for multiple aggregates users, or for multiple aggregated devices, among other training data. The training data is obtained. For example, training data for a particular user (e.g., the user for which the LSTM RNN will be used to predict destinations) is obtained. The training data can be the input data 1911 tagged with an actual destination location. For example, over time, input data 1911 is recorded from the media-playback device 102 and stored. Destination locations are also recorded and stored in association with input data 1911 that has been recently recorded. In other examples, the data is regional data aggregated among many different devices, which can provide a larger data set from which to train. In still other examples, the LSTM RNN is first trained on regional movement patterns of multiple different devices and then fine-tuned for the particular media-playback device 102. In some examples, the prediction engine 1922 can predict the future locations with bias against how the LSTM RNN was trained. For instance, an LSTM RNN trained using regional data of multiple different devices predicts that a particular device moves according to the majority in the region until the particular device moves in a substantially different sequence.

In examples, the operation 1920 includes providing the input data 1911 as input to a destination prediction engine 1922 having a long short-term memory recurrent neural network trained to predict a destination; and obtaining the destination as output from the destination prediction engine 1922.

In examples, there are separate machine learning models trained for each region. For instance, a first machine learning model corresponds to a first region, and a second machine learning model corresponds to a second region. In such examples, the destination prediction engine 1922 selects a machine learning model (e.g., based on a current location of the media-playback device 102).

In an example, there is a user-based model where each device's future location is evaluated at a specific machine learning model stored in a data store associated with a particular user (e.g., stored in association with the particular user's account, which is linked to one or more devices). In this manner, the destination prediction engine 1922 is able to access a total number of machine learning models equal to the number of users multiplied-by the total number of regions for which machine learning models exist. Using such a model, the operation 1920 can include providing the input data 1911 as input to the destination prediction engine 1922 and further providing the input data 1911 as input to the LSTM RNN, where the LSTM RNN is trained to predict a destination for a particular user, based on training data regarding the particular user.

In another example, there is a region-based machine learning model where each device's future location is evaluated at a general machine learning model stored in a data store associated with all users (e.g., all accounts of users) in a region rather than a particular user. In such an example, the destination prediction engine 1922 is able to access a total number of models equal to the total number of regions.

Using such a model, the operation 1920 can include providing the input data 1911 as input to the destination prediction engine 1922, and further providing the input data 1911 as input to the LSTM RNN, where the LSTM RNN is trained to predict a destination for a particular region, based on training data of a plurality of aggregated users.

In yet another example, there is a region-plus-user-based machine learning model. This machine learning model is a combination of the user-based machine learning model and the region-based machine learning model. For instance, each user's future location is evaluated on a region-based model that further is trained to put more weight on patterns of the specific user. Using such a model, the operation 1920 can include providing the input data 1911 as input to the LSTM RNN, where the LSTM RNN is trained to predict a destination based on training data of a plurality of aggregate users and a particular user.

In an example, there is a machine learning model configured to predict network connectivity quality. The machine learning model is configured to take as input a location as a zone and provide mean coverage of a zone as output.

At operation 1930, a predicted destination 1932 is obtained as output from the destination prediction engine 1922. In an example, the predicted destination is a single destination. In other examples, the predicted destination 1932 includes multiple locations, such as a sequence with the three zones having the highest probability that the user will traverse next. An example predicted destination 1932 is shown and described in relation to FIG. 20 and FIG. 22.

FIG. 22 illustrates an example form of the predicted destination 1932. In the illustrated example, the predicted destination 1932 is encoded in a vector, in particular a one-hot vector, where the value of the index "19", which corresponds to the sub-region 2006 of FIG. 20, has a value of "1" and all other indexes have a value of "0". This indicates that the sub-region 2006 is the predicted destination.

Additional Examples and Considerations

In predicting content to cache, it is advantageous to determine where to cache, when to cache, what to cache, and how much to cache. In determining where to cache, it is advantageous to determine at what location point it would be advantageous for the media-playback device 102 to begin caching media content items. For example, if the caching engine 108 determines that, in 20 minutes, there will be a region of limited network connectivity, the caching engine 108 will cause a certain number of media playback items to be cached to avoid interruption of functionality.

In determining when to cache, it is advantageous to determine how far into the future the area of limited network connectivity will be reached. For instance, the caching engine 108 determines that, in thirty minutes, the caching engine 108 needs to have enough cached content to sustain ten minutes of uninterrupted playback (e.g., the media-playback device 102 will reach a region of limited network connectivity in thirty minutes and will be in the region for ten minutes). The caching engine 108 then determines the amount of time required to download enough media content to cover the area of limited network connectivity. For instance, the caching engine 108 divides a file size of the media content items predicted to be played by the download speed of the media-playback device 102. In many examples, the caching engine 108 waits to begin downloading the media content items until the media-playback device 102 is relatively close to the region of limited network connectivity. Waiting to begin downloading can be advantageous because waiting gives the caching engine 108 additional time to obtain user input relevant to determining what content to cache. If the caching engine 108 caches content too early, the risk that the cached content is inaccurate increases (e.g., there is a risk that the user changes his or her mind regarding which content to consume).

In many examples, the caching engine 108 identifies areas of strong connectivity and caches media content items while the media-playback device 102 is in the areas of strong connectivity. For instance, the processes described in FIGS. 16-22 can be modified to identify areas of strong connectivity, and cache media content items during time spent in those areas. Caching in areas of strong connectivity can facilitate efficient use of battery and network resources.

In determining what to cache, the caching engine 108 predicts the content that the media-playback device 102 will play while in the area of limited network connectivity. For instance, the caching engine 108 predicts whether the media-playback device 102 will continue to play from a same media context (e.g., album, artist, or playlist) or will receive a request to play media content items from a different context. The caching engine 108 can further predict to which context the playback will switch.

In determining the amount of media content items to cache, the caching engine 108 predicts how many media content items to cache in order to have uninterrupted playback during time spent in the area of limited network connectivity.

In an example, a device identifier of the device on which to cache is provided, and used for determining different media content item preferences on different devices.

Examples described herein (e.g., state prediction examples) have applications beyond predictive caching. For instance, techniques using current or predicted states to determine media content items to cache can be used to determine media content items to recommend to a user. For instance, determining that a user transitioned from a workout state to a travel state, can be used to recommend media content items or modify what media content items are played. For instance a content recommendation system can use state transition data to determine whether to play a same or different kind of content. Further, the particular states involved in the transition can be used to determine media content items to provide or recommend to a user. For instance, responsive to a transition from a workout state to a travel state, a content recommendation system can provide relaxing music.

Additionally, states and prediction can be applicable across multiple devices. For instance, where a user is currently using a smart phone and a predicted future state is a travel state, then a media delivery system can cause a vehicle device (e.g., a vehicle head unit) to cache media content items associated with the travel state. As another example, where a user listens to music with a smart watch while in a running state, transitions to a home state, and activates a smart speaker, the media-delivery system can provide media content associated with the home state to the smart speaker responsive to the smart speaker being activated.

The various embodiments described above are provided by way of illustration only, and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method of obtaining a predicted destination of a media-playback device, the method comprising:
    determining, based on input data associated with the media-playback device, a subregion in which the media-playback device is located, wherein the sub-region is the smallest unit of location in at least one connectivity map;
    formatting an identifier of the sub-region as a one-hot vector;
    providing the one-hot vector as input to a destination prediction engine having a neural network trained to predict a predicted destination;
    obtaining the predicted destination as output from the destination prediction engine;
    selecting media content items based on a state corresponding to the predicted destination, wherein selected media content items are selected based on a state score indicating suitability for playback during the state; and
    causing the media-playback device to cache the selected media content items.

2. The method of claim 1, wherein the neural network is a long short-term memory "LSTM" recurrent neural network "RNN".

3. The method of claim 2, wherein the LSTM RNN learns time-series using separate weight matrices and gates to determine what information to use at a current time step, what information to forget from a previous time step, and what output is provided to a next time step.

4. The method of claim 1, wherein the input data includes: location data, bearing data, time data and altitude data of the media-playback device.

5. The method of claim 1, wherein the neural network is trained to predict the predicted destination based on training data regarding a particular user.

6. The method of claim 1, wherein the neural network is trained to predict the predicted destination based on training data regarding a particular media-playback device.

7. The method of claim 6, wherein the neural network is first trained on regional movement patterns of multiple different devices and then fine-tuned for the particular media-playback device.

8. The method of claim 1, wherein the neural network is trained to predict the predicted destination based on training data of a plurality of aggregated users.

9. The method of claim 1, wherein the neural network is selected by the destination prediction engine from a plurality of neural networks each trained for a different region.

10. The method of claim 9, wherein the neural network is selected by the destination prediction engine based on a current location of the media-playback device.

11. The method of claim 1,
    wherein the predicted destination is multiple locations; and
    wherein the multiple locations comprise a sequence with three zones having the highest probability that the media-playback device will traverse next.

12. The method of claim 1, wherein the output is encoded as another one-hot vector.

13. The method of claim 1, further comprising, prior to providing the input data as input to the destination prediction engine:
    determining whether a known destination is available from a mapping application operating on the media-playback device; and
    determining that the known destination is not available from the mapping application.

14. The method of claim 1, wherein the at least one connectivity map is a data structure storing connectivity data for a particular region in a usable form.

15. The method of claim 14, further comprising:
    obtaining area data based on the at least one connectivity map, wherein the area data specifies one or more areas of strong network connectivity and one or more areas of limited network connectivity; and
    caching one or more media content items when the media-playback device is in the one or more areas of strong network connectivity.

16. A system, comprising:
    one or more processing devices; and
    a memory device coupled to the one or more processing devices and storing instructions thereon that, when executed by the one or more processing devices, cause the one or more processing devices to:
        determine, based on input data associated with a media-playback device, a sub-region in which the media-playback device is located, wherein the sub-region is the smallest unit of location in at least one connectivity map;
        format an identifier of the sub-region as a one-hot vector;
        provide the one-hot vector as input to a destination prediction engine having a neural network trained to predict a predicted destination;
        obtain the predicted destination as output from the destination prediction engine;
        select media content items based on a state corresponding to the predicted destination, wherein selected media content items are selected based on a state score indicating suitability for playback during the state; and
        cause the media-playback device to cache the selected media content items.

17. The system of claim 16, wherein the output is encoded as another one-hot vector.

18. The system of claim 16, wherein the predicted destination is multiple locations comprising a sequence with three zones having the highest probability that the media-playback device will traverse next.

19. The system of claim 16, wherein the at least one connectivity map is a data structure storing connectivity data for a particular region in a usable form.

20. The system of claim 19, wherein the instructions, when executed by the one or more processing devices, cause the one or more processing devices to:
    obtain area data based on the at least one connectivity map, wherein the area data specifies one or more areas of strong network connectivity and one or more areas of limited network connectivity; and
    cache one or more media content items when the media-playback device is in the one or more areas of strong network connectivity.

* * * * *